United States Patent
Polavarapu et al.

(10) Patent No.: US 10,382,680 B2
(45) Date of Patent: Aug. 13, 2019

(54) METHODS AND SYSTEMS FOR GENERATING STITCHED VIDEO CONTENT FROM MULTIPLE OVERLAPPING AND CONCURRENTLY-GENERATED VIDEO INSTANCES

(71) Applicant: Verizon Patent and Licensing Inc., Arlington, VA (US)

(72) Inventors: Vinay Polavarapu, Irving, TX (US); Alexey Imaev, Jersey City, NJ (US); Alexander Zilbershtein, Buffalo Grove, IL (US); Paul Duree, San Jose, CA (US); Richard Kern, Dickson City, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 240 days.

(21) Appl. No.: 15/339,607

(22) Filed: Oct. 31, 2016

(65) Prior Publication Data
US 2018/0122078 A1    May 3, 2018

(51) Int. Cl.
*G06T 3/40* (2006.01)
*G06T 7/38* (2017.01)
(Continued)

(52) U.S. Cl.
CPC ....... *H04N 5/23238* (2013.01); *G06T 3/4038* (2013.01); *G06T 7/38* (2017.01);
(Continued)

(58) Field of Classification Search
CPC .. H04N 5/23238; H04N 5/3415; H04N 13/00; G06T 3/0062
See application file for complete search history.

(56) References Cited

U.S. PATENT DOCUMENTS

2002/0061131 A1* 5/2002 Sawhney ............... G06T 15/205
  382/154
2008/0253685 A1* 10/2008 Kuranov ............... G06T 3/4038
  382/284
(Continued)

OTHER PUBLICATIONS

Gadermayr M, Liedlgruber M, Uhl A, Vécsei A. Evaluation of different distortion correction methods and interpolation techniques for an automated classification of celiac disease. Computer methods and programs in biomedicine. Dec. 1, 2013;112(3):694-712. (Year: 2013).*

*Primary Examiner* — Clifford Hilaire

(57) ABSTRACT

An exemplary video generation system (the "system") receives a plurality of overlapping and concurrently-captured video instances from a plurality of video capture devices in a static configuration. The system temporally synchronizes concurrently-captured video data from each video instance to form a plurality of image sets and identifies a particular image set from the plurality of image sets. The system then performs a camera registration process on the particular image set in order to determine camera registration parameter data. Based on the camera registration parameter data determined using the camera registration process with respect to the particular image set, the system then performs a video stitching process on each of the image sets within the plurality of image sets to form stitched video content representative of a scene captured by the plurality of video capture devices in the static configuration. Corresponding methods and systems are also disclosed.

20 Claims, 15 Drawing Sheets

(51) Int. Cl.
*G11B 27/10* (2006.01)
*H04N 5/232* (2006.01)
*G11B 27/031* (2006.01)

(52) U.S. Cl.
CPC ............ *G11B 27/031* (2013.01); *G11B 27/10* (2013.01); *G06T 2200/32* (2013.01); *G06T 2207/10016* (2013.01)

(56) References Cited

U.S. PATENT DOCUMENTS

| | | | | |
|---|---|---|---|---|
| 2014/0314325 | A1* | 10/2014 | Muninder | G06T 3/4038 382/199 |
| 2014/0362176 | A1* | 12/2014 | St. Clair | H04N 5/23238 348/36 |
| 2016/0119541 | A1* | 4/2016 | Alvarado-Moya | G06T 3/4038 348/38 |
| 2016/0180865 | A1* | 6/2016 | Citerin | G06K 9/0057 382/103 |
| 2016/0191815 | A1* | 6/2016 | Annau | H04N 5/247 348/38 |
| 2017/0264942 | A1* | 9/2017 | Li | H04N 21/4307 |

* cited by examiner

METHODS AND SYSTEMS FOR GENERATING STITCHED VIDEO CONTENT FROM MULTIPLE OVERLAPPING AND CONCURRENTLY-GENERATED VIDEO INSTANCES

BACKGROUND INFORMATION

Image capture devices such as digital still-frame cameras, film-based still-frame cameras, etc., capture images representative of scenes at which the image capture devices are pointed. The quality and breadth of a representation of a scene captured within a particular image may be dependent on a variety of factors including optical characteristics and/or other design characteristics of the image capture devices. For example, an image capture device with a relatively wide angle lens may capture images representing broader portions of scenes than, for example, an image capture device that has a relatively narrow angle lens. In some situations, it may be desirable to capture a broader portion of a scene than an image capture device may be configured to capture with one shot. For example, the image capture device may not be positionable at a suitable perspective (e.g., may not be able to back up far enough) to capture a desired breadth of a particular scene, or may have to distort an image to an undesirable extent (e.g., by use of an extremely wide-angle lens) in order to capture the desired breadth of the scene. As a result, the image capture device may be used to sequentially capture a plurality of images (e.g., overlapping images) that may be combined into a single panoramic image (i.e., a "stitched image" stitched together from parts of the plurality of images) that captures the desired breadth of the scene with no distortion or a more acceptable amount of distortion.

Similarly, video capture devices such as motion picture cameras, digital video cameras, etc., may be configured to capture video images representative of scenes at which the video capture devices are pointed. As with the image capture devices described above, it may be desirable in some situations to capture a video image of a broader portion of a scene than a video capture device may be configured to capture in one shot. However, as will be described in more detail herein, the generating of panoramic or "stitched" video content may be associated with various challenges and complications that do not arise in the generating of still panoramic images.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
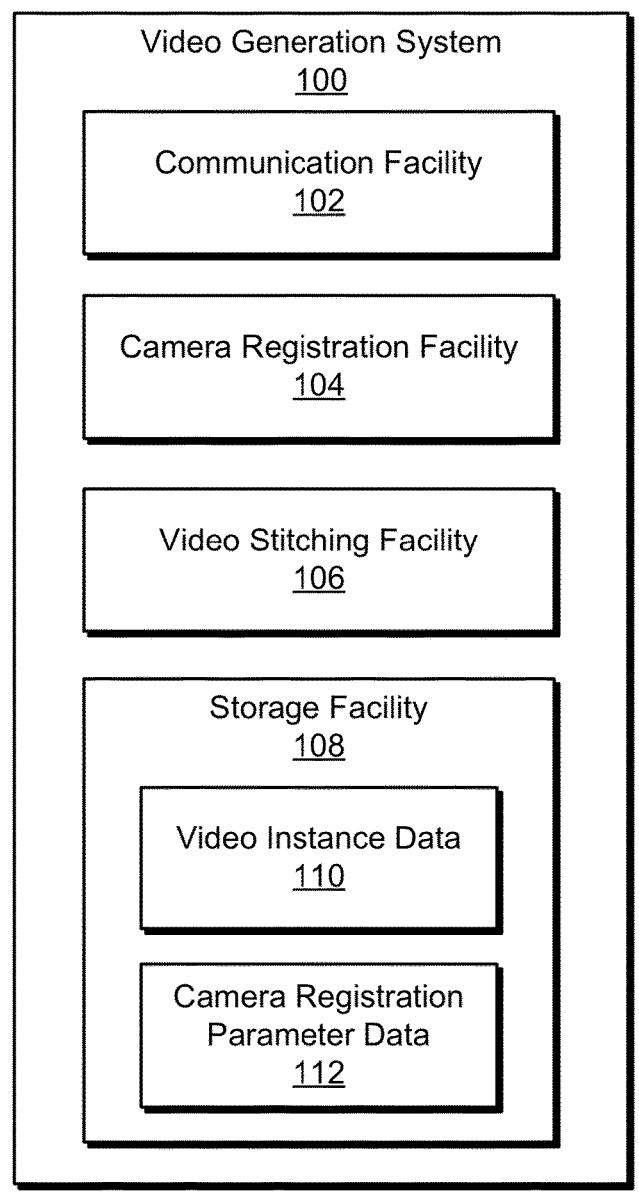
FIG. 1 illustrates an exemplary video generation system that may generates stitched video content from multiple overlapping and concurrently-captured video instances according to principles described herein.

Methods and systems for generating stitched video content (e.g., panoramic video content, etc.) from multiple overlapping and concurrently-captured video instances are described herein. As used herein, "stitched video content" or "panoramic video content" may refer to video content (e.g., video data that may be rendered by a media player device to play back video) that is generated as a panoramic combination of multiple overlapping and concurrently-captured video instances stitched together to form a single video instance representative of a broader portion of a scene than any of the concurrently-captured video instances may represent alone. As will be described and illustrated below, overlapping and concurrently-captured video instances may include any video instances (e.g., video files, video streams, and/or other suitable aggregations of video data) captured (i.e., recorded) during roughly the same period of time by video capture devices positioned with respective vantage points that are not identical but that are similar enough (i.e., in location, angle, etc.) that video data represented within each video instance overlaps with video data represented within at least one other video instance. Accordingly, in some examples, stitched video content may include wide angle video content or video content of a very large and expansive area (e.g., IMAX video content). In other examples, stitched video content may include 360° video content, such as panoramic video content representative of a full ring around a center point, panoramic video content representative of a full 360°×180° sphere around the center point, or the like. For example, virtual reality panoramic video content (e.g., immersive panoramic video content such as spherical 360° video content or 360° video content conforming to shapes other than spheres) may be used to present a user with an immersive virtual reality world as part of a virtual reality experience.

As will be described and illustrated below, a video generation system (e.g., a stitched video generation system, a panoramic video generation system, or another such system implemented by, for example, one or more servers or other computing devices configured to generate stitched video content) may receive a plurality of raw video instances from a plurality of video capture devices located in a static configuration with respect to one another such that the video capture devices in the plurality of video capture devices collectively capture a scene (e.g., a panoramic scene that includes too much breadth to be captured or conveniently captured by just one of the video capture devices alone). Each raw video instance in the plurality of raw video instances may include video data that partially overlaps with video data from at least one other raw video instance in the plurality of raw video instances and that is concurrently captured with video data from all of the other raw video instances in the plurality of raw video instances. The video generation system may temporally synchronize the concurrently-captured video data of each raw video instance in the plurality of the raw video instances to form a plurality of image sets. For example, as will be described and illustrated below, each image set in the plurality of image sets may include a raw image from each raw video instance in the plurality of raw video instances, wherein all of the raw images within each image set in the plurality of image sets are captured simultaneously by the video capture devices.

Based on the temporally synchronizing of the concurrently-captured video data of each raw video instance, the video generation system may select a particular image set from the plurality of image sets and attempt to perform a camera registration process on the particular image set in order to determine camera registration parameter data (i.e., data representative of the plurality of video capture devices and the static configuration in which the plurality of video capture devices is located). By successfully performing the camera registration process and determining valid camera registration parameter data, the video generation system may facilitate a video stitching process, as will be described below.

For the sake of clarity, the camera registration process and the video stitching process will often be described herein in terms of just two images (e.g., a "first" and a "second" image) within any particular image set. However, it will be understood that a particular image set may include any number of raw images that may be combined (e.g., processed and stitched together) to form a single frame of stitched video content as may serve a particular implementation. For example, a relatively large number of video capture devices (e.g., six to twelve video capture devices) may be used to capture a spherical 360° scene. As such, although only two images may be described in detail in certain examples, it will be understood that each image set in the plurality of image sets may actually include a relatively large number of images (e.g., six to twelve images) and that similar operations may be performed with respect to all of the images as are specifically described with respect to the first and the second images.

As a first operation of the camera registration process, the video generation system may identify, within both a first raw image of the particular image set and a second raw image of the particular image set, a visual feature. For example, the visual feature may be one of several common features that the video generation system identifies are shared between the first raw image and the second raw image in an area of the first and second raw images that overlaps. Examples of visual features will be described and illustrated below.

Continuing with the camera registration process, the video generation system may undistort, based on at least one distortion coefficient associated with the plurality of video capture devices, the first and second raw images of the particular image set to generate a first undistorted image corresponding to the first raw image and a second undistorted image corresponding to the second raw image. The at least one distortion coefficient may be generated using a calibration process (e.g., a one-time calibration process), as will be described in more detail below. The video generation system may then map, based on the at least one distortion coefficient, the visual feature identified within both the first and the second raw images of the particular image set to both the first and the second undistorted images, respectively. Based on the mapping, the video generation system may match (e.g., correlate, associate, link, etc.) the visual feature mapped to the first undistorted image with the visual feature mapped to the second undistorted image. Then, based on the matching, the video generation system may determine the camera registration parameter data representative of the plurality of video capture devices and the static configuration in which the plurality of video capture devices is located. Each of these operations will be described in more detail below.

As described above, the video generation system may then perform, based on the camera registration parameter data, a video stitching process for each image set in the plurality of image sets. By performing the video stitching process for each particular image set in the plurality of images sets, the video generation system may form stitched video content representative of the scene. For example, each image set in the plurality of image sets upon which the video stitching process is performed may correspond to one frame of the resultant stitched video content.

As a first operation of the video stitching process, the video generation system may undistort, based on the at least one distortion coefficient associated with the plurality of video capture devices, a first raw image of the particular image set and a second raw image of the particular image set that overlaps the first raw image to generate a first undistorted image corresponding to the first raw image and a second undistorted image corresponding to the second raw image. The video generation system may then warp the first and the second undistorted images to contour to a three-dimensional framework based on the camera registration parameter data. For example, the video generation system may warp both the first and second undistorted images concurrently. Further based on the camera registration parameter data, the video generation system may composite the warped first and second undistorted images onto a particular area of the three-dimensional framework such that the warped first and second undistorted images overlap with one another in accordance with the camera registration parameter data to form an overlapping region. The video generation system may then stitch together (e.g., along a seam within the overlapping region in which the warped first and second undistorted images overlap on the three-dimensional framework), the warped first and second undistorted images with respect to the particular area of the three-dimensional framework onto which the warped first and second images are composited.

By performing the video stitching process on each image set in the plurality of image sets in this way, the video generation system may form stitched video content representative of the scene. Examples of these and other operations that may be performed as part of the camera registration process, the video stitching process, and/or other processes described herein, will be described and illustrated below.

Various advantages may result from generating stitched video content from multiple overlapping and concurrently-captured video instances in accordance with methods and systems described herein. In particular, systems and methods described herein may provide for convenient, efficient, and/or accurate generation of stitched video content from multiple overlapping and concurrently-captured video instances. For example, users may simply provide a video generation system with desired parameters for stitched video content and a plurality of raw video instances (e.g., video files or video streams that have not been synchronized to one another or otherwise pre-processed) and, without any other involvement, may receive renderable stitched video content from the video generation system that adheres to the user's desired parameters (e.g., resolution, frame rate, video quality, file format, encoding format, etc.).

Additionally, several challenges associated with generating stitched video content may be overcome by the methods and systems described herein. For example, one challenge of generating stitched video content that may not arise in the context of generating stitched still images may be the fact that a single video capture device may not be sequentially aimed at different portions of a scene (e.g., a panoramic scene) because the video capture device cannot concurrently capture video from more than one portion of the scene at a time (i.e., the video capture device can only be pointed at one portion of the scene at a time). To overcome this challenge, multiple overlapping and concurrently-captured video instances may be captured by a plurality of video capture devices located in a static configuration with respect to one another to collectively capture the scene.

Even when using multiple overlapping and concurrently-captured video instances to generate stitched video content, additional challenges unique to video content may arise. For example, if each video capture device is powered on and/or begins recording at slightly different times (as well as being powered off and/or stopping recording at slightly different times), the overlapping and concurrently-captured video instances captured by the video capture devices may be out of synchronization such that the raw images in any particular image set may not be simultaneously captured. As a result, the stitched video content generated may be inaccurate or disorienting (e.g., from frame to frame, objects may hop around instantly and haphazardly to different parts of the video). As will be described below, this challenge may be overcome by an automatic temporal synchronization that may be performed before the camera registration process begins.

Moreover, video instances are associated with significantly more data than still images, requiring significantly more processing and potentially exacerbating time constraints. For example, if a process for generating a stitched still image is relatively slow or inefficient, that inefficiency may not present a significant problem to a user who may have to wait only an additional second or two for a stitched image to be generated. However, if video instances including multiple frames per second are to be stitched together to form stitched video content, small delays and inefficiencies may be multiplied to become significant drawbacks. For example, in certain applications, it may be desirable to generate stitched video content in real time (i.e., to generate stitched video content at least as quickly as new raw video is captured such that stitched video content may be provided for a live event with only a short delay). By performing the camera registration process on only one image set (or a relatively small number of image sets until valid camera registration parameter data is determined) and then using the camera registration parameter data to quickly perform the video stitching process on every image set thereafter, the methods and systems described herein may be relatively efficient and may enable stitched video content to be generated in real time. As such, stitched (e.g., 360° or virtual reality) broadcasts of live events may transmitted in real-time or near real-time to allow users to experience the live events as the live events are unfolding in the real world.

For example, a media player device may display a field of view of an immersive virtual reality world (e.g., representative of a live event that is currently ongoing). The immersive virtual reality world may be fully immersive in the sense that the user may not be presented with any image of the real world in which the user is located while the user is experiencing the immersive virtual reality world, in contrast to certain "augmented reality" technologies. However, while real-world scenery directly surrounding the user may not be presented together with the immersive virtual reality world, the immersive virtual reality world may, in certain examples, be generated based on data (e.g., image and/or audio data) representative of camera-captured real-world scenery rather than animated or computer-generated scenery of imaginary worlds such as those commonly generated for video games, animated entertainment programs, and so forth. For example, as will be described in more detail below, camera-captured real-world scenery may include real-world places (e.g., city streets, buildings, landscapes, etc.), real-world events (e.g., sporting events, large celebrations such as New Year's Eve or Mardi Gras, etc.), fictionalized live action entertainment (e.g., virtual reality television shows, virtual reality movies, etc.), and so forth.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary video generation system 100 ("system 100") that generates stitched video content from multiple overlapping and concurrently-captured video instances. System 100 may be a panoramic or a stitched video generation system and may include, without limitation, a communication facility 102, a camera registration facility 104, a video stitching facility 106, and a storage facility 108 selectively and communicatively coupled to one another. It will be recognized that although facilities 102 through 108 are shown to be separate facilities in FIG. 1, facilities 102 through 108 may be combined (e.g., combined into a single facility) or divided into more facilities in any way that may serve a particular implementation.

Communication facility 102 may receive, generate, process, and/or otherwise access and prepare incoming data (e.g., raw video instances) for a camera registration process and/or a video stitching process. For example, communication facility 102 may receive a plurality of raw video instances (e.g., each including video data that partially overlaps with video data from at least one other raw video instance and that is concurrently captured with video data from all of the other raw video instances) from a plurality of video capture devices located in a static configuration with respect to one another such that the video capture devices in the plurality of video capture devices collectively capture a scene (e.g., a panoramic scene). In certain examples, the video capture devices may be incorporated within communication facility 102 such that communication facility 102 receives the plurality of raw video instances by generating or accessing the plurality of raw video instances (e.g., from the video capture devices incorporated within communication facility 102, from storage facility 108, etc.). Communication facility 102 may process or prepare the received raw video instances in any way as may serve a particular implementation. For example, communication facility 102 may temporally synchronize the concurrently-captured video data of each raw video instance in the plurality of the raw video instances to form a plurality of image sets (e.g., each including a raw image from each raw video instance such that all of the raw images within each image set are captured simultaneously).

After a camera registration process and a video stitching process have been performed on one or more of the image sets generated by communication facility 102 to form stitched video content representative of a scene as described below, communication facility 102 may also prepare, process, store, and/or transmit fully functional (i.e., fully formed so as not to require additional processing before use) stitched video content to other devices such as media player devices configured to render the stitched video content.

Camera registration facility 104 may read, load-up, or otherwise access one or more images within a particular image set (e.g., an image set from the plurality of image sets formed by communication facility 102) and perform a camera registration process on the particular image set. The camera registration process may be performed in any way as may serve a particular implementation, examples of which will be provided in more detail below. If camera registration facility 104 is successful in performing the camera registration process on one particular image set in the plurality of image sets, camera registration facility 104 may determine valid camera registration parameter data that may be used by video stitching facility 106 to perform a video stitching process on each and every image set in the plurality of image sets formed by communication facility 102 (e.g., each and every image set generated by the same set of video capture devices while positioned in the same configuration). However, in certain examples and for reasons that will be described below, camera registration facility 104 may fail to generate valid camera registration parameter data during one or more attempts to perform the camera registration process. Each time camera registration facility 104 fails to generate valid camera registration parameter data, camera registration facility 104 may loop back to attempt to perform the camera registration process again with a different image set from the plurality of image sets.

Once camera registration facility 104 has generated valid camera registration parameter data, video stitching facility 106 may use the camera registration parameter data to perform a video stitching process in any way as may serve a particular implementation. Examples of the video stitching process will be described in more detail below. Video stitching facility 106 may perform the video stitching process on each and every image set in the plurality of image sets formed by communication facility 102. For example, each image set for which the video stitching process has been performed may represent a single frame of stitched video content that is output by system 100 (e.g., transmitted by communication facility 102, as described above). In some examples, video stitching facility 106 may form stitched video content that conforms to particular parameters such as parameters inherent in the raw video instances received, parameters designated by a user, or the like. For instance, video stitching facility 106 may generate stitched video content that takes any shape or form as may serve a particular implementation (e.g., 360° by 180° spherical stitched video content, stitched video content renderable to form an immersive virtual reality world used to generate a virtual reality experience, etc.). Additionally, the stitched video content may adhere to particular video parameters such as video parameters designated by a user (e.g., video resolution, video frame rate, video file or streaming format, video encoding scheme, etc.).

Storage facility 108 may maintain video instance data 110, camera registration parameter data 112, and/or any other data received, generated, managed, maintained, used, and/or transmitted by facilities 102 through 106 in a particular implementation. For example, video instance data 110 may be used to store or buffer raw video instances (e.g., received by communication facility 102 from a plurality of video capture devices) and/or other data associated with such raw video instances. Camera registration parameter data 112 may be used to store data or parameters determined as part of a camera registration process and used as part of a video stitching process as described below. For example, camera registration parameter data 112 may include data representative of one or more masks, extrinsic or intrinsic parameters associated with video capture devices and/or a static configuration of the video capture devices, and/or other camera registration parameter data as may serve a particular implementation. Storage facility 108 may further include other types of data as may be used to perform the operations described herein. For example, storage facility 108 may store or buffer finished stitched video content that may be transmitted (e.g., in real-time or later on demand) to other devices or systems configured to render the stitched video content.

As described above, system 100 may receive a plurality of raw video instances from a plurality of video capture devices and process the raw video instances to generate stitched video content. As further described above, each raw video instance in the plurality of raw video instances received by system 100 may include video data that partially overlaps with video data from at least one other raw video instance in the plurality of raw video instances and that is concurrently captured with video data from all of the other raw video instances in the plurality of raw video instances. In order to capture the raw video instances, a plurality of video capture devices may be located in a static configuration with respect to one another such that the video capture devices collectively capture a scene. The video capture devices and the static configuration in which they are located may take any form as may serve a particular implementation. For example, the video capture devices may be cameras of any suitable quality level or resolution (e.g., standard definition ("SD") video cameras, high definition ("HD") video cameras, ultra high definition ("UHD," "4K," etc.) video cameras, etc.), and may be statically outward facing (e.g., connected to a rigid camera rig), statically inward facing (e.g., located at fixed points surrounding a scene or stage and aiming inward to capture the scene or stage), or positioned in any other configuration as may serve a particular implementation.

Figure 2:
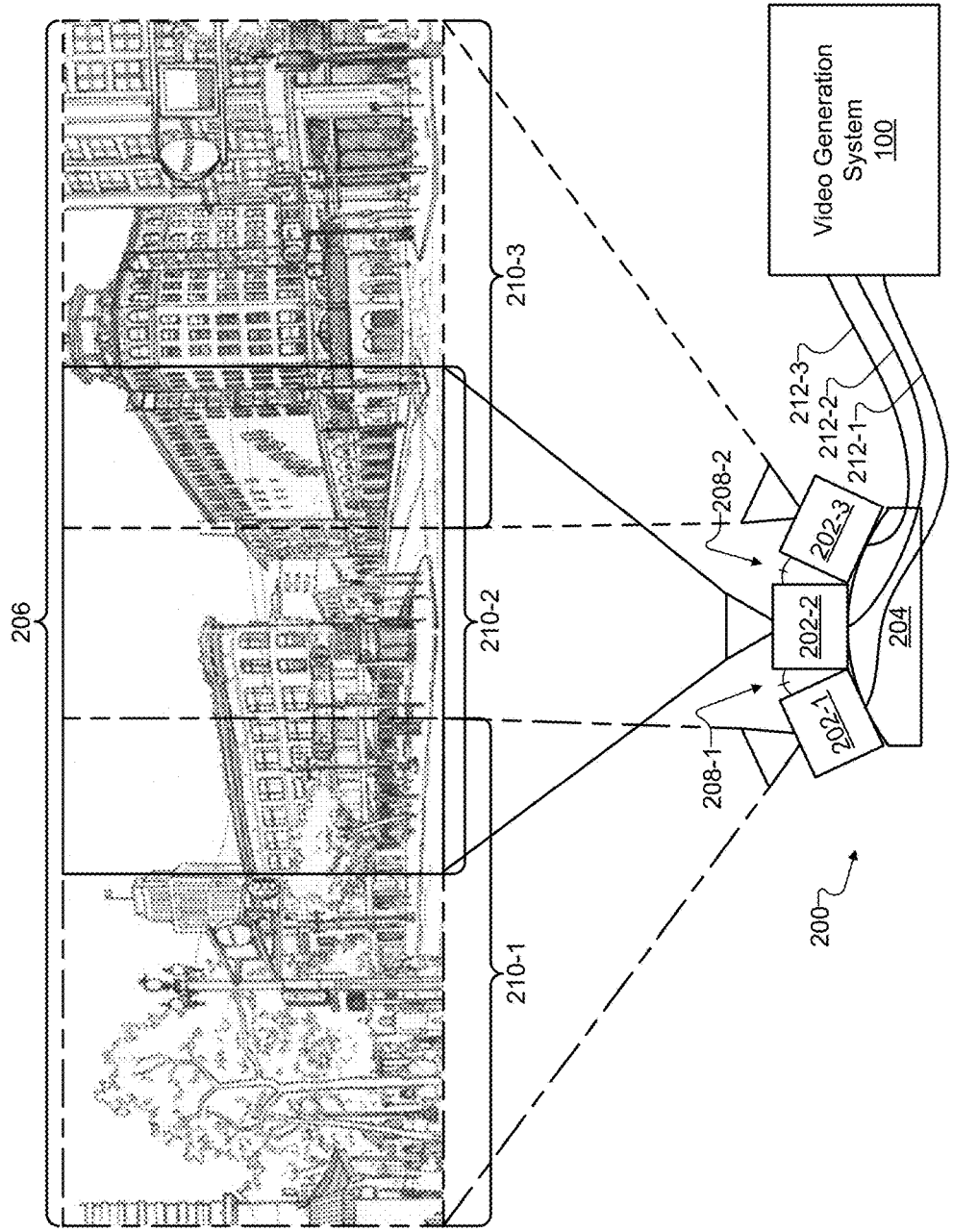
FIG. 2 illustrates an exemplary configuration in which exemplary video capture devices communicate multiple overlapping and concurrently-captured video instances to the video generation system of FIG. 1 to allow the video generation system to generate stitched video content according to principles described herein.

To illustrate, FIG. 2 shows an exemplary configuration 200 in which exemplary video capture devices 202 (i.e., video capture devices 202-1 through 202-3) communicate multiple overlapping and concurrently-captured video instances to system 100 to allow system 100 to generate stitched video content according to methods described herein. Video capture devices 202 may include or be implemented by any device or combination of devices configured to capture video data (e.g., audio and video data) representative of the environment around the device or combination of devices as may serve a particular implementation. For example, video capture devices 202 may be implemented by portable, standalone video cameras, by mobile computing devices that include a video camera (e.g., smartphones, portable music players, tablets, etc.), by professional-quality movie cameras, and/or by any other consumer-grade or professional-grade video capture device or combination of video capture devices as may serve a particular implementation. As will be described and illustrated below, in certain examples, each video capture device 202 may represent an individual segment-capture camera built into a single panoramic camera (e.g., a 360° camera). Additionally, video capture devices 202 may capture and store or transmit raw video instances at any suitable video quality, video resolution, data format, and/or with any other characteristics as may serve a particular implementation.

As shown in FIG. 2, video capture devices 202 may each be statically connected to a camera rig 204 and aimed at different portions of a scene 206 (e.g., a panoramic street scene as depicted in FIG. 2). In some examples, a specially-designed camera rig 204 may be configured to statically aim video capture devices 202 at specific angles 208 (i.e., angles 208-1 and 208-2) such that video capture devices 202 capture a desired breadth of scene 206 while partially overlapping with one another. In other examples, a camera rig such as camera rig 204 may not be used, but video capture devices 202 may otherwise be located in a static configuration with respect to one another (e.g., by using tripods or other video capture device supports to position video capture devices 202 around a scene or a stage, etc.). While video capture devices 202 and other video capture devices described herein may be illustrated and/or described as being disposed in a "static configuration," it will be understood that, in certain implementations, the video capture devices disposed in the static configuration may be "static" only with respect to one another (e.g., such that the distance between the video capture devices, the respective angles at which the different video capture devices are oriented with respect to one another, etc., may not change) while the video capture devices may dynamically move with respect to the real-world scene (i.e., while maintaining the static configuration with respect to one another). For example, a camera rig could arrange video capture devices in a static configuration with respect to one another, while the camera rig and the video capture devices disposed thereon could be mounted, for example, atop a vehicle that is moving through the real-world scene, on a helmet of a person skydiving, on a pole carried by a person skiing, on a drone flying through the air, or on any other moving object as may serve a particular implementation.

As shown in FIG. 2, each video capture device 202 is aimed at a different, but overlapping, portion 210 of scene 206 (i.e., portions 210-1 through 210-3) in accordance with angles 208 imposed by camera rig 204. For example, as shown, portion 210-1 may partially overlap with portion 210-2, and portion 210-2 may further partially overlap (on the other side) with portion 210-3. Because of the overlap between portions 210, video data captured by each video capture device 202 may partially overlap with video data captured by at least one other video capture device 202. Specifically, raw video instances 212 (i.e., raw video instances 212-1 through 212-3) may be transmitted from each of video capture devices 202, respectively, to system 100 for processing as described above and as will be further described below. Thus for example, video data included within raw video instance 212-1 may partially overlap with (e.g., may be equivalent to, may be similar to, may represent the same portion of a scene as) video data included within raw video instance 212-2, and the same or other video data included within raw video instance 212-2 may partially overlap with video data included within raw video instance 212-3. Raw video instances 212 may be communicated from video capture devices 202 to system 100 in any suitable way, such as by wired communication, wireless communication, by way of a network or networks, and/or by way of any other communication methods or protocols as may serve a particular implementation.

While FIG. 2 illustrates three video capture devices 202 in an outward facing, co-planar configuration capturing non-360° scene 206, it will be understood that any number of video capture devices 202 may be used in any configuration (e.g., including non-planar configurations, inward-facing configurations, etc.) to capture any portions of a scene surrounding or being surrounded by the video capture devices. For example, a larger number of video capture devices (e.g., six or more video capture devices) may be configured in a non-planar configuration to capture a spherical 360° scene surrounding the video capture devices.

Figure 3:
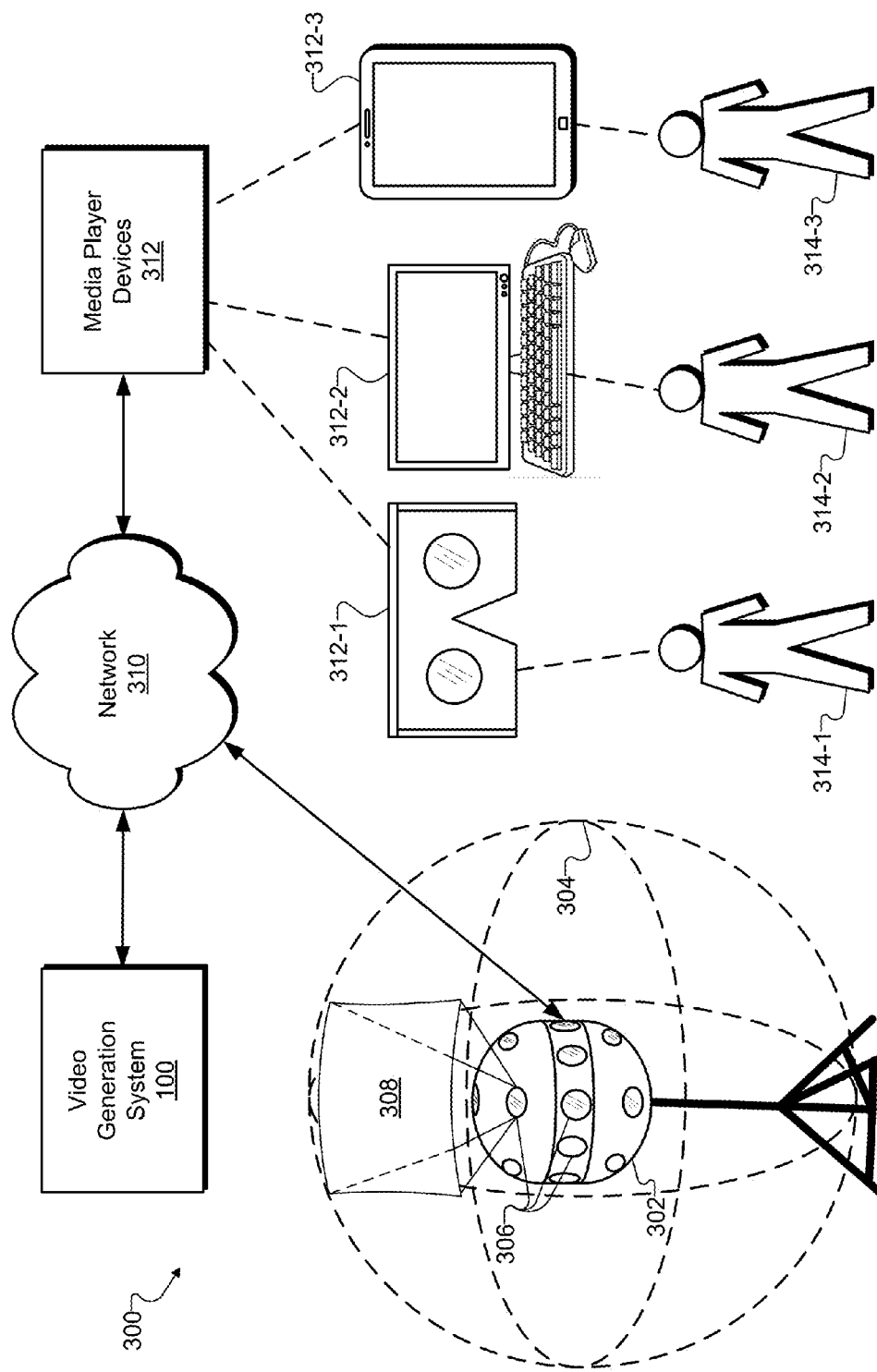
FIG. 3 illustrates an exemplary configuration in which exemplary implementations of a 360° camera, the video generation system of FIG. 1, and several media player devices interoperate to generate and play back stitched video content according to principles described herein.

FIG. 3 illustrates an exemplary configuration in which exemplary implementations of a spherical 360° camera, system 100 (described above in FIG. 1), and several media player devices interoperate to generate and play back stitched video content. In particular, the example of FIG. 3 illustrates how stitched video content may be generated and used to provide virtual reality experiences to users. Virtual reality and related technologies (e.g., augmented reality technologies, etc.) may be one application for stitched video content and/or the methods and systems for generating stitched video content from multiple overlapping and concurrently-captured video instances described herein. Accordingly, an example of a virtual reality configuration 300 will now be described.

As shown in FIG. 3, a 360° camera 302 ("camera 302") may capture and/or generate a 360° video instance of a scene 304 (e.g., a 360° panoramic scene) around a center point corresponding to camera 302. For example, camera 302 may capture a plurality of images from each of a plurality of segment capture cameras 306 built into or otherwise associated with camera 302, and may generate the 360° video instance of scene 304 by transmitting the plurality of images captured by segment-capture cameras 306 to system 100 to be converted into stitched video content according to the methods described herein. For example, each segment capture camera 306 may capture a respective portion (or segment) of scene 304 such that each of the portions at least partially overlaps with at least one other portion to cover some or all of scene 304. To illustrate, one segment 308 of scene 304 that is captured by one particular segment capture camera 306 is shown in FIG. 3. It will be understood that other overlapping portions similar to segment 308 may be captured by each of the other segment capture cameras 306 (not explicitly shown).

Camera 302 may capture data representative of 360° video instances of scene 304 and transmit the data to system 100 by way of a network 310. After processing the data representative of the 360° video instances to generate stitched video content (e.g., stitched video content representative of an immersive virtual reality world based on scene 304), system 100 may transmit data representative of the stitched video content to one or more media player devices 312 such as a head-mounted virtual reality device 312-1, a personal computer device 312-2, a mobile device 312-3, and/or to any other form factor of media player device as may serve a particular implementation. Regardless of what form factor media player devices 312 take, users 314 (e.g., users 314-1 through 314-3) may experience the immersive virtual reality world by way of media player devices 312. Each of the elements of configuration 100 will now be described in detail.

Camera 302 may be set up and/or operated by a virtual reality content creator (e.g., a producer of commercial virtual reality content, a consumer such as one of users 314 creating content, etc.) and may include any type of camera (e.g., including any type of video capture device described herein) that is configured to capture video data representative of scene 304 in a vicinity of camera 302. For example, camera 302 may be implemented by one or more fish-eye cameras, wide-angle cameras, or the like. As such, camera 302 may be configured to capture 360° video data representative of scene 304 around a center point corresponding to camera 302. A 360° video instance may include any aggregation of video data (e.g., a video file, a video stream, etc.) that depicts the surroundings (e.g., scene 304) of a center point (e.g., a center point associated with the location of camera 302) on all sides along at least one dimension. For example, one type of 360° video instance may include a stitched image that depicts a complete 360° by 45° ring around a center point corresponding to a camera (e.g., camera 302). Another type of 360° video instance may include a spherical image that depicts not only the ring around the center point, but an entire 360° by 180° sphere surrounding the center point on all sides. In certain examples, a 360° video instance may be based on a non-circular geometric structure. For example, certain 360° video instances may be based on cubes, rectangular prisms, pyramids, and/or other geometric structures that may serve a particular implementation, rather than being based on spheres.

Camera 302 may be configured to capture the data representative of the 360° video instance of scene 304 in any way as may serve a particular implementation. For example, as shown in FIG. 3, camera 302 may capture various segments of scene 304 using segment capture cameras 306, which may each capture video data representative of a single segment of scene 304 (e.g., such as segment 308) that collectively covers some or all of scene 304. In certain examples, segment capture cameras 306 may each represent a single camera unit (e.g., including a lens and suitable image capture hardware) built into a single 360° camera configured to capture 360° video instances. In other examples, such as described and illustrated above with respect to FIG. 2, camera 302 may be implemented by a rigid camera rig (e.g., such as camera rig 204) and an array of segment capture cameras 306 that are each a single, standalone video capture device configured to capture non-360° video data. In certain examples, camera 302 may include one or more stereoscopic cameras. Subsequent to capturing raw video instances representative of scene 304, camera 302 may be configured to transmit the raw video instances to system 100 such that processing and/or combining (e.g., stitching together) of the raw video instances may be performed within system 100 according to the methods described herein.

Camera 302 may capture any scene 304 that may serve a particular embodiment. For example, scene 304 may include any indoor or outdoor real-world location such as the streets of a city, a museum, a scenic landscape, a satellite orbiting and looking down upon the Earth, the surface of another planet, or the like. Scene 304 may further include certain events such as a stock car race, a football game or other sporting event, a large-scale party such as New Year's Eve on Times Square in New York City, or other events that may interest potential users. In certain examples, scene 304 may be a setting for a fictionalized event, such as a set of a live-action virtual reality television show or movie.

In the example of FIG. 3, system 100 may comprise a server or other computing device associated with (e.g., provided and/or managed by) a virtual reality media content service provider (e.g., a network service provider, a cable service provider, a satellite service provider, an Internet service provider, a provider of virtual reality mobile applications, etc.) and may be configured to provide virtual reality media content to users (e.g., subscribers of a virtual reality media content service, users who download or otherwise acquire virtual reality mobile applications, etc.) by way of media player devices 312. Specific details of the functionality of system 100 were described above in relation to FIG. 1 and will be further described in more detail below.

Based on the 360° raw video instances representative of scene 304 received from camera 302, system 100 may generate and maintain stitched video content representative of an immersive virtual reality world that, when rendered by a media player device such as one of media player devices 312, may be experienced by a user such as users 314. For example, system 100 may generate a three-dimensional ("3D") model of the immersive virtual reality world where virtual objects may be presented along with projections of scene 304 to a user experiencing the immersive virtual reality world. To generate the immersive virtual reality world from the stitched video content, system 100 may perform video transcoding, slicing, orchestration, modeling, and/or any other processing that may serve a particular embodiment.

Subsequent to or concurrent with generating one or more immersive virtual reality worlds, system 100 may provide access to the virtual reality media content programs for users such as subscribers of a virtual reality media content service operated by the virtual reality media content provider and/or users who download or otherwise acquire virtual reality mobile applications provided by the virtual reality media content provider. To this end, system 100 may provide data representative of content of the immersive virtual reality world to be rendered by media player devices 312 in respective fields of view that are responsive to user input from users of media player devices 312. For example, as will be described in more detail below, system 100 may transmit files or stream data representative of the immersive virtual reality world associated with stitched video content generated by system 100.

Camera 302, system 100, and media player devices 312 may communicate with one another using any suitable communication technologies, devices, media, and/or protocols supportive of data communications, including, but not limited to, socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Network 310 may include any provider-specific network (e.g., a cable or satellite carrier network or a mobile telephone network), the Internet, wide area network, or any other suitable network. Data may flow between camera 302, system 100, and/or media player devices 312 by way of network 310 using any communication technologies, devices, media, and protocols as may serve a particular implementation. While only one network 310 is shown to interconnect camera 302, system 100, and media player devices 312 in FIG. 3, it will be recognized that these devices and systems may intercommunicate by way of multiple interconnected networks as may serve a particular implementation.

Media player devices 312 (i.e., head-mounted virtual reality device 312-1, personal computer device 312-2, and mobile device 312-3) may be used by users 314 to access and experience virtual reality media content received from system 100. To this end, media player devices 312 may each include or be implemented by any device capable of presenting a field of view of an immersive virtual reality world and detecting user input from a user (e.g., one of users 314) to dynamically change the content within the field of view as the user experiences the immersive virtual reality world. For example, media player devices 312 may include or be implemented by a head-mounted virtual reality device (e.g., a virtual reality gaming device), a personal computer device (e.g., a desktop computer, laptop computer, etc.), a mobile or wireless device (e.g., a smartphone, a tablet device, a mobile reader, etc.), or any other device or configuration of devices that may serve a particular implementation to facilitate receiving and/or presenting virtual reality media content and/or any other type of stitched video content. As will be described in more detail below, different types of media player devices 312 (e.g., head-mounted virtual reality devices, personal computer devices, mobile devices, etc.) may provide different types of virtual reality experiences having different levels of immersiveness for users 314.

To facilitate users 314 in experiencing virtual reality media content, each of media player devices 312 may include or be associated with at least one display screen upon which a field of view of an immersive virtual reality world may be presented. Media player devices 312 may also include software configured to receive, maintain, and/or process data representative of the immersive virtual reality world to present content of the immersive virtual reality world within the field of view on the display screens of the media player devices. For example, media player devices 312 may include dedicated, standalone software applications (e.g., mobile applications) configured to process and present data representative of immersive virtual reality worlds on the displays. In other examples, the software used to present the content of the immersive virtual reality worlds may include non-dedicated software such as standard web browser applications.

Figure 4:
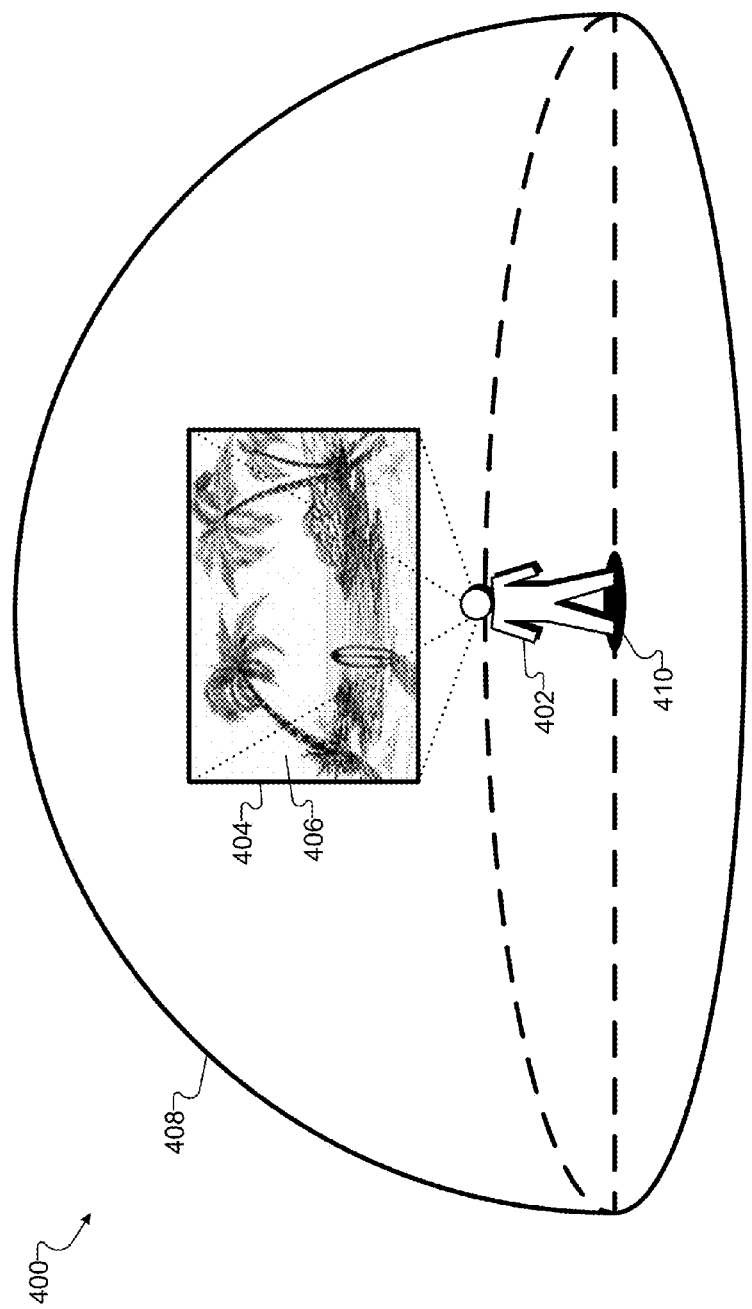
FIG. 4 illustrates an exemplary virtual reality experience in which a user is presented with an exemplary field of view that includes content of an exemplary immersive virtual reality world according to principles described herein.

FIG. 4 illustrates an exemplary virtual reality experience 400 in which a user 402 is presented with an exemplary field of view 404 that includes content 406 of an exemplary immersive virtual reality world 408 ("world 408"). User 402 may experience immersive virtual reality world 408 ("world 408") by providing user input to dynamically change field of view 404 to display whatever content within world 408 that user 402 wishes to view. For example, the user input provided by user 402 may include an indication that user 402 wishes to look at content not currently presented within field of view 404 (i.e., content of world 408 other than content 406). For media player devices 312 such as personal computer 312-2 and/or mobile device 312-3, this user input may include a mouse movement, navigation key input from a keyboard, a swipe gesture, or the like. For media player devices 312 incorporating particular sensors (e.g., motion, directional, and/or orientation sensors) such as head-mounted virtual reality device 312-1 and/or mobile device 312-3, however, this user input may include a change to an orientation of the display screen of the media player device 312 with respect to at least one axis of at least two orthogonal axes. For example, the media player device may be configured to sense changes in orientation of the display screen with respect to an x-axis, a y-axis, and a z-axis that are all orthogonal to one another. As such, the media player device 312 may be configured to detect the change to the orientation of the display screen as user 402 experiences world 408, and the dynamic changing of the content includes gradually replacing content 406 with other content of world 408 that is determined to be visible from a viewpoint of user 402 within world 408 according to the detected change to the orientation of the display screen with respect to the at least one axis.

To illustrate, FIG. 4 shows that content 406 may include real-world scenery (e.g., captured from scene 304) depicting a beach with palm trees and a surfboard. User 402 may provide user input to a media player device by which user 402 is experiencing world 408 (e.g., one of media player devices 312) to indicate that user 402 wishes to look at content to the left of content 406 currently included within field of view 404. For example, user 402 may press a left navigation key on a keyboard, perform a swipe gesture to the right, or change the orientation of the display screen with respect to a y-axis by rotating his or her head to the left while wearing a head-mounted device. In response, the real-world scenery (i.e., the palm trees, the surfboard, etc.) may scroll to the right across field of view 404 to give user 402 a sensation that he or she is turning to look to the left in world 408. As content 406 scrolls off the right side of field of view 404, new content (not explicitly shown in FIG. 4) smoothly scrolls onto the left side of field of view 404. In this way, user 402 may provide user input to cause field of view 404 to present any part of world 408 that user 402 desires.

In FIG. 4, world 408 is illustrated as a semi-sphere, indicating that user 402 may look in any direction that is substantially forward, backward, left, right, and/or up. It will be understood that, in certain implementations, world 408 may include an entire 360° by 180° sphere so that every direction in which user 402 may direct field of view 404 is associated with dynamic and/or real-world scenery content of world 408.

As shown in FIG. 4, world 408 may appear to surround a center point 410 associated with user 402. In some embodiments, center point 410 may correspond to a location of a camera (e.g., camera 302) used to capture the content of world 408 (e.g., scene 304). As such, center point 410 may be static or may move through world 408 in a way that user 402 is unable to control (e.g. moving through world 408 in a same manner as camera 302 moved through scene 304 during the creation of the virtual reality media content). In other embodiments, user 402 may be able to provide input to modify where center point 410 is located within world 408. For example, user 402 may hop from one center point to another (e.g., corresponding to where each of a plurality of 360° cameras captured 360° video instances) within world 408 or cause center point 410 to move continuously within world 408. While center point 410 is illustrated at the feet of user 402 for simplicity of illustration, it will be understood that center point 410 may actually be located at the eye level of user 402.

Figure 5:
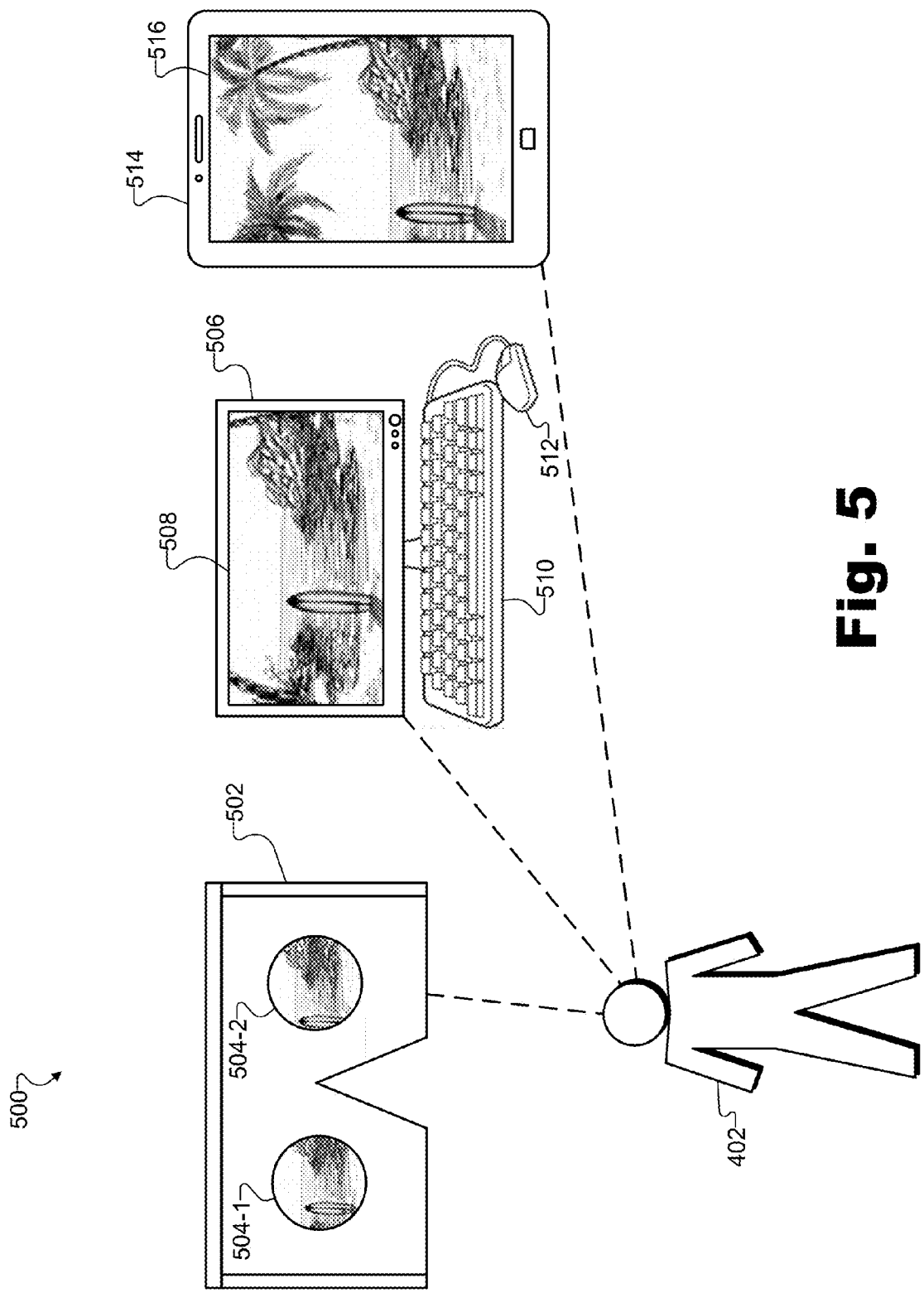
FIG. 5 illustrates exemplary media player devices configured to facilitate experiencing the immersive virtual reality world of FIG. 4 by a user according to principles described herein.

As mentioned above, different types of media player devices may provide different experiences for user 402 by presenting field of view 404 of world 408 in different ways, by receiving user input from user 402 in different ways, and so forth. To illustrate, FIG. 5 shows exemplary media player devices 500 configured to facilitate experiencing world 408 by user 402. Media player devices 500 may correspond to media player devices 312, described above in relation to FIG. 5.

As one example, a head-mounted virtual reality device 502 may be mounted on the head of user 402 and arranged so that each of the eyes of user 402 sees a distinct display screen 504 (e.g., display screens 504-1 and 504-2) within head-mounted virtual reality device 502. In some examples, a single display screen 504 may be presented and shared by both eyes of user 402. In other examples, as shown, distinct display screens 504 within head-mounted virtual reality device 502 may be configured to display slightly different versions of field of view 404 (e.g., stereoscopic versions of field of view 404 that may be captured by one or more stereoscopic cameras) to give user 402 the sense that world 408 is three-dimensional. Display screens 504 may also be configured to display content 406 such that content 406 fills the peripheral vision of user 402, providing even more of a sense of realism to user 402. Moreover, head-mounted virtual reality device 502 may include motion sensors (e.g., accelerometers), directional sensors (e.g., magnetometers), orientation sensors (e.g., gyroscopes), and/or other suitable sensors to detect natural movements (e.g., head movements) of user 402 as user 402 experiences world 408. Thus, user 402 may provide input indicative of a desire to move field of view 404 in a certain direction and by a certain amount in world 408 by simply turning his or her head in that direction and by that amount. As such, head-mounted virtual reality device 502 may provide user 402 with a natural and hands-free experience that does not require any physical console control to experience the immersive virtual reality world and that may be the most immersive virtual reality experience provided by any type of media player device.

As another example of a media player device, a personal computer device 506 having a display screen 508 (e.g., a monitor) may be used by user 402 to experience world 408. Because display screen 508 may not provide the distinct stereoscopic view for each of the user's eyes and/or may not fill the user's peripheral vision, personal computer device 506 may not provide the same degree of immersiveness that head-mounted virtual reality device 502 provides. However, personal computer device 506 may be associated with other advantages such as its ubiquity among casual virtual reality users that may not be inclined to purchase or use a head-mounted virtual reality device. In some examples, personal computer device 506 may allow a user to experience virtual reality content within a standard web browser so that user 402 may conveniently experience world 408 without using special devices or downloading special software. User 402 may provide user input to personal computer device 506 by way of a keyboard 510 (e.g., using navigation keys on keyboard 510 to move field of view 404) and/or by way of a mouse 512 (e.g., by moving mouse 512 to move field of view 404). In certain examples, a combination of keyboard 510 and mouse 512 may be used to provide user input such as by moving field of view 404 by way of navigation keys on keyboard 510 and clicking or otherwise interacting with objects within world 408 by way of mouse 512.

As yet another example of a media player device, a mobile device 514 (i.e., a mobile computing device, a mobile communication device, etc.) having a display screen 516 may be used by user 402 to experience world 408. Mobile device 514 may incorporate certain advantages of both head-mounted virtual reality devices and personal computer devices to provide the most versatile type of media player device for experiencing world 408. Specifically, like personal computer devices, mobile devices are extremely ubiquitous, potentially providing access to many more people than dedicated head-mounted virtual reality devices. However, because many mobile devices are equipped with motion sensors, directional sensors, orientation sensors, etc., mobile devices may also be configured to provide user 402 with an immersive experience comparable to that provided by head-mounted virtual reality devices. For example, mobile device 514 may be configured to divide display screen 516 into two versions (e.g., stereoscopic versions) of field of view 404 and to present content 406 to fill the peripheral vision of user 402 when mobile device 514 is mounted to the head of user 402 using a relatively inexpensive and commercially-available mounting apparatus (e.g., a cardboard apparatus). In other embodiments, mobile device 514 may facilitate experiencing world 408 by receiving movement-based user input at arm's length (i.e., not mounted to the head of user 402 but acting as a hand-held dynamic window for looking around world 408), by receiving swipe gestures on a touchscreen, or by other techniques that may serve a particular embodiment.

While examples of certain media player devices have been described, the examples are illustrative and not limiting. A media player device may include any suitable device and/or configuration of devices configured to facilitate receipt and presentation of virtual reality media content according to principles described herein. For example, a media player device may include a tethered device configuration (e.g., a tethered headset device) or an untethered device configuration (e.g., a display screen untethered from a processing device). As another example, a head-mounted virtual reality media player device or other media player device may be used in conjunction with a virtual reality controller such as a wearable controller (e.g., a ring controller) and/or a handheld controller.

To illustrate how system 100 may generate stitched video content from multiple overlapping and concurrently-captured video instances, various examples will now be provided. In particular, the examples below illustrate an exemplary method for generating stitched video content that focuses on details of a camera registration process, and an exemplary method for generating stitched video content that focuses on details of a video stitching process.

Figure 6:
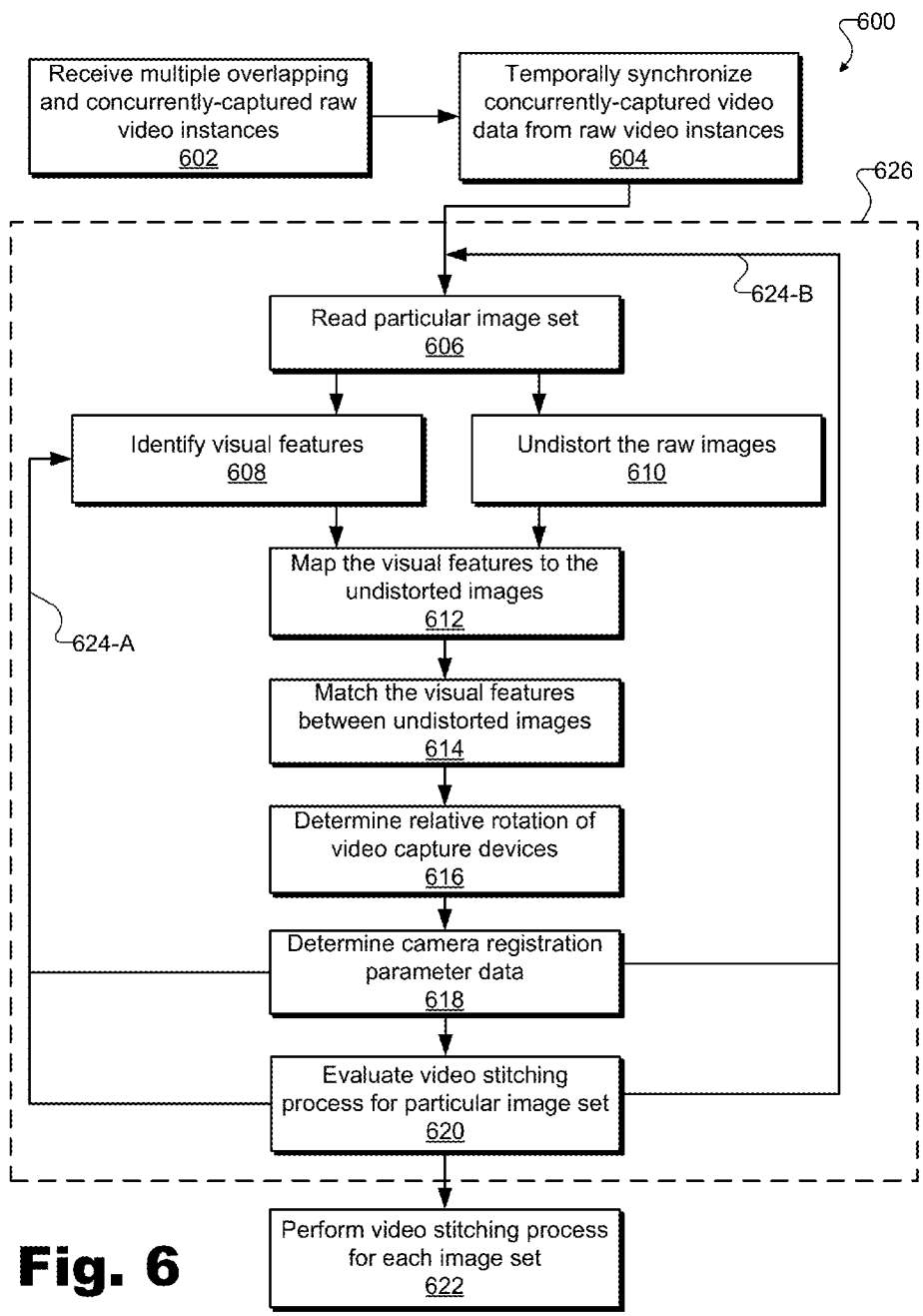
FIG. 6 illustrates an exemplary method for generating stitched video content from multiple overlapping and concurrently-captured video instances according to principles described herein.

FIG. 6 illustrates an exemplary method 600 for generating stitched video content from multiple overlapping and concurrently-captured video instances. In particular, as mentioned above, method 600 illustrates how stitched video content may be generated from multiple overlapping and concurrently-captured video instances with particular attention focused on a camera registration process that will be described in relation to FIG. 6 and other figures related to FIG. 6. While FIG. 6 illustrates exemplary operations according to one embodiment, other embodiments may omit, add to, reorder, and/or modify any of the operations shown in FIG. 6. One or more of the operations shown in FIG. 6 may be performed by system 100 and/or any implementation thereof.

In operation 602, a video generation system such as system 100 may receive a plurality of raw video instances (e.g., raw video instances 210 in FIG. 2, raw video instances described in relation to FIG. 3, etc.) from a plurality of video capture devices located in a static configuration (e.g., video capture devices 202 in FIG. 2, segment-capture cameras 306 of camera 302 in FIG. 3, etc.) to collectively capture a scene (e.g., a panoramic scene such as scene 206 in FIG. 2, scene 304 in FIG. 3, etc.). As described above, each raw video instance in the plurality of raw video instances may include video data that partially overlaps with video data from at least one other raw video instance in the plurality of raw video instances and that is concurrently captured with video data from all of the other raw video instances in the plurality of raw video instances.

After receiving the raw video instances in operation 602, the video generation system may perform operation 604. In operation 604, the video generation system may temporally synchronize the concurrently-captured video data of each raw video instance in the plurality of the raw video instances to form a plurality of image sets. More specifically, each image set in the plurality of image sets may include a raw image from each raw video instance in the plurality of raw video instances such that all of the raw images within each image set in the plurality of image sets are captured simultaneously. Operation 604 may be performed in any suitable way. For example, the temporally synchronizing of the concurrently-captured video data of each raw video instance in the plurality of the raw video instances to form the plurality of image sets may include identifying an audible feature common to every respective audio track associated with the raw video instances in the plurality of raw video instances (e.g., based on respective audio tracks associated with and synchronized to each raw video instance in the plurality of raw video instances), and forming the plurality of image sets by associating together, into each image set in the plurality of image sets, one raw image from every raw video instance in the plurality of raw video instances that is captured at a same temporal offset from the identified audible feature common to every respective audio track associated with the raw video instances in the plurality of raw video instances.

Figure 7:
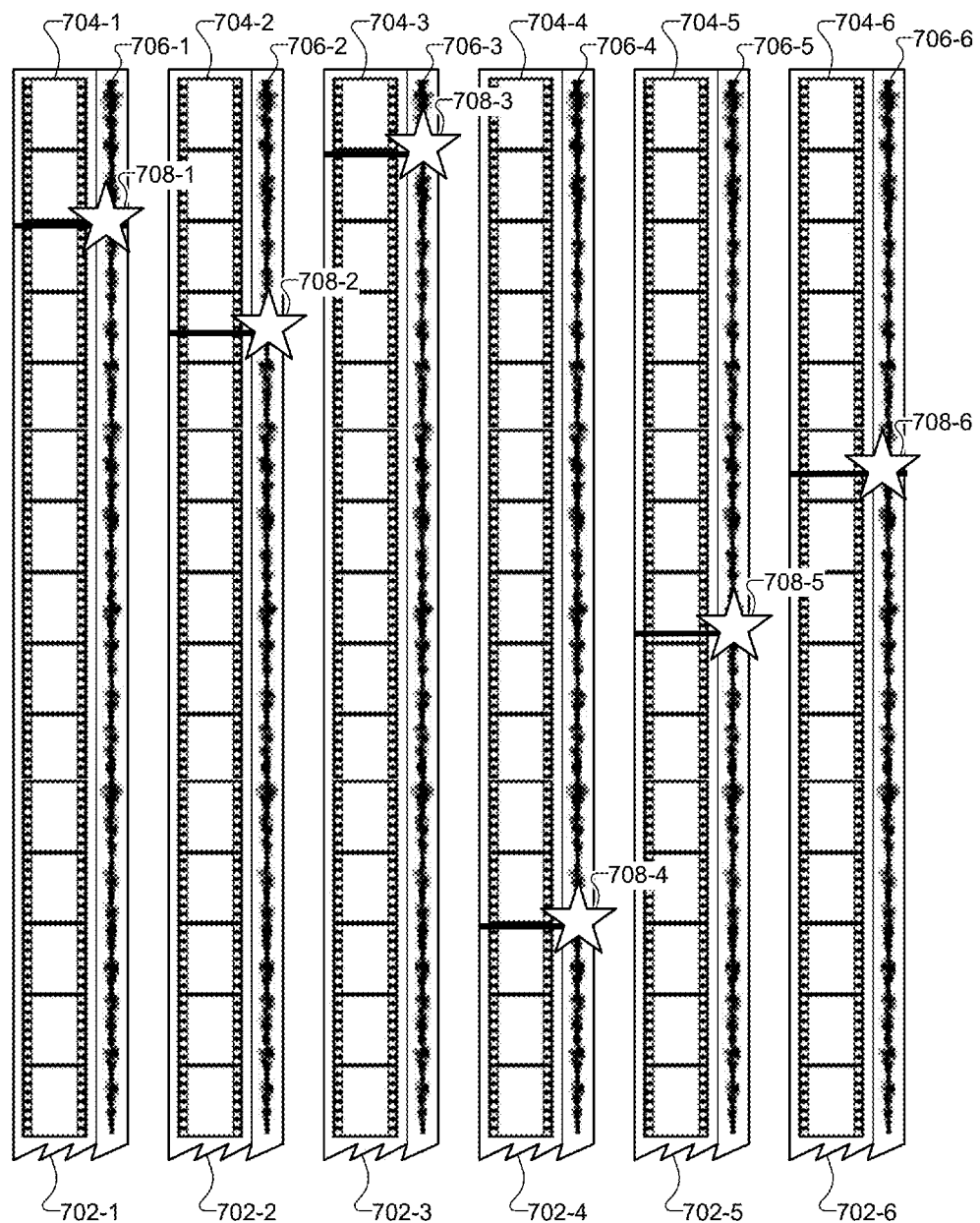
FIG. 7 illustrates multiple exemplary overlapping and concurrently-captured video instances prior to being temporally synchronized according to principles described herein.
Figure 8:
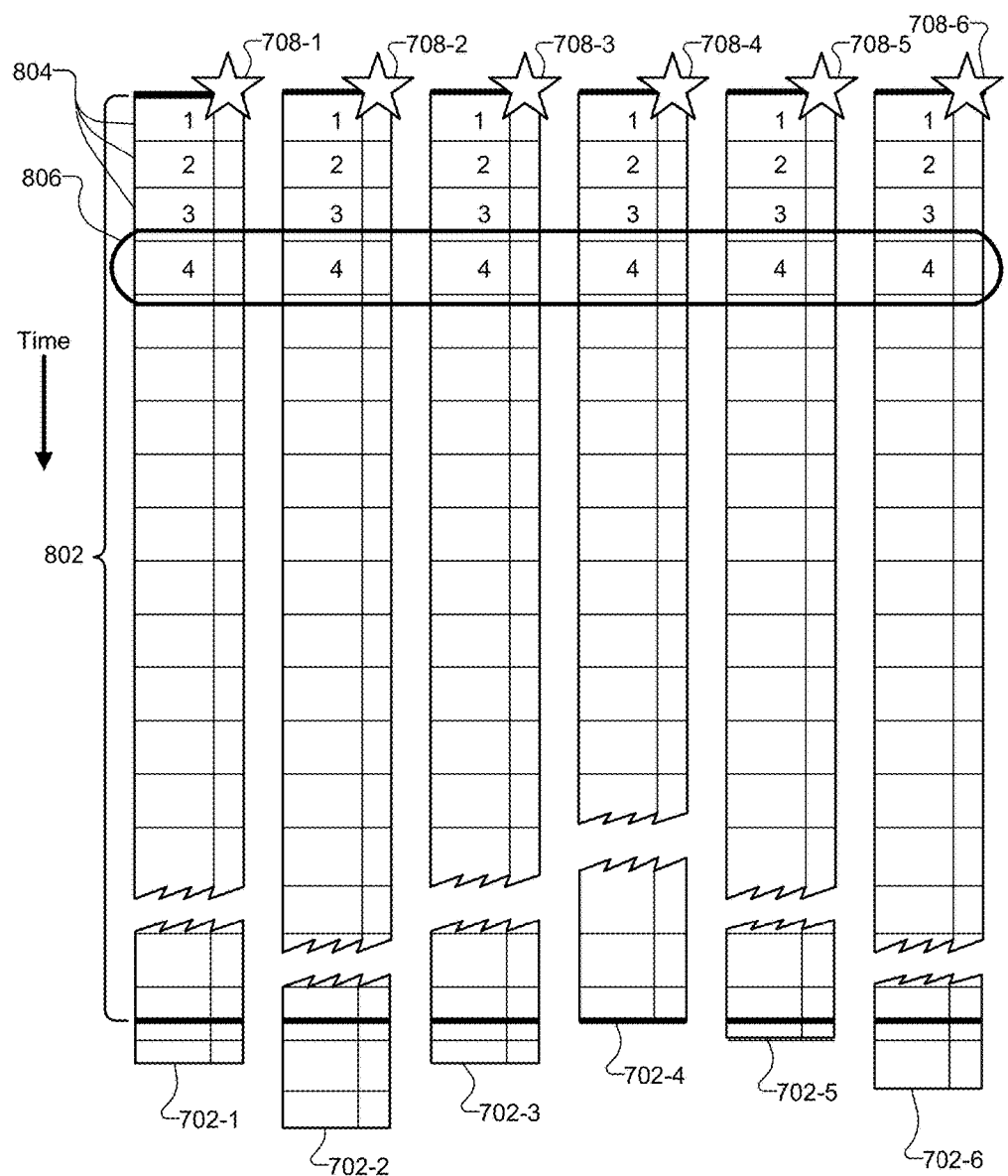
FIG. 8 illustrates the overlapping and concurrently-captured video instances of FIG. 7 subsequent to being temporally synchronized according to principles described herein.

To illustrate, FIG. 7 shows multiple exemplary overlapping and concurrently-captured video instances prior to being temporally synchronized, while FIG. 8 illustrates the overlapping and concurrently-captured video instances of FIG. 7 subsequent to being temporally synchronized. FIG. 7, FIG. 8, and the elements of various video instances depicted therein are included for illustrative purposes only and it will be understood that any suitable number of video instances each having any suitable video, audio, and/or other elements may be used as may serve a particular implementation. For example, in certain implementations, one or more of the video instances represented in FIGS. 7 and/or 8 may include video data only or audio data only (i.e., so as to rely on other video instances for video data and/or audio data not included within the one or more video instances). Additionally or alternatively, one or more of the video instances represented in FIGS. 7 and/or 8 may include additional elements (e.g., a synchronization track) to assist with synchronization or other aspects of the video representations embodied in the video instances.

As shown, FIG. 7 illustrates a number of raw video instances 702 (raw video instances 702-1 through 702-6) that may be "raw" in the sense that raw video instances 702 have not been pre-synchronized or otherwise pre-processed prior to being received by the video generation system (i.e., system 100). Rather, each of raw video instances 702 may include a video track 704 (i.e., video tracks 704-1 through 704-6 of raw video instances 702-1 through 702-6, respectively) that has been captured by a particular video capture device independently from other video tracks 704 captured by other video capture devices, and thus is not synchronized with the other video tracks 704.

Each of raw video instances 702 may further include an audio track 706 (i.e., audio tracks 706-1 through 706-6 of raw video instances 702-1 through 702-6, respectively) that has been, for example, captured by the same respective video capture device that captured the corresponding video track 704 or by an audio capture device associated with the video capture device or another suitable device. While audio tracks 706 are represented symbolically by a sound waveform, it will be understood that audio tracks 706 may be captured, stored, and/or otherwise processed in any suitable way and using any suitable digital format, analog format, and/or other format as may serve a particular implementation.

In certain examples, such as illustrated in FIG. 7, while each video track 704 may be captured independently from (i.e., and may be asynchronous with) every other video track 704 and each audio track 706 may be captured independently from every other audio track 706, corresponding video tracks 704 and audio tracks 706 for each raw video instance 702 may be synchronous with one another. For example, a particular video capture device may generate and transmit raw video instance 702-1 such that video track 704-1 and audio track 706-1 are synchronous with one another (i.e., sounds recorded on audio track 706-1 correspond in time to visual content represented in video track 704-1). Likewise, other video capture devices may generate and transmit raw video instances 702-2 through 702-6 such that respective pairs of video tracks 704-2 through 704-6 and audio tracks 706-2 through 704-6 are similarly synchronous with one another. Additionally, because all of raw video instances 702 may represent different portions of the same scene, the audio track 706 of every raw video instance 702 may overlap with the audio track 706 of every other raw video instance 702, even if the video track 704 of any given raw video instance 702 may only overlap with a subset of the other video tracks 704 of the other raw video instances 702.

Accordingly, as illustrated, an audible feature 708 may exist that is common to (e.g., may be found within) every respective audio track 706 of each raw video instance 702, and that may be identified by (e.g., found by, recognized by) system 100. Audible feature 708 may be any audible feature of an audio track that may be distinctly and uniquely recognized and/or distinguished from other audible features of the audio track as may serve a particular implementation. For example, audible feature 708 may include a distinct and recognizable sound (e.g., a particular click, pop, etc.), an audio clip (e.g., a clip lasting for a few seconds or longer) representative of one or more human voices and/or other ambient sounds within the scene recorded by the video capture devices onto audio tracks 706, or the like.

As mentioned above, raw video instances 702 may be asynchronous with one another. For example, each respective video capture device generating each respective raw video instance 702 may be powered on and/or set to begin capturing video at slightly different times. Accordingly, as shown in FIG. 7, system 100 may identify audible feature 708 (i.e., drawn as audible feature 708-1 through 708-6 on each of raw video instances 702-1 through 702-6, respectively) at a different temporal position on every raw video instance 702 (i.e., on every audio track 706). For example, if the top of each representation of raw video instance 702 drawn in FIG. 7 represents the beginning of a particular raw video instance 702, it may be seen that raw video instance 702-4 may begin first in time (not capturing audible feature 708-4 until a relatively long period of time after capture begins), followed by raw video instance 702-5, raw video instance 702-6, raw video instance 702-2, and raw video instance 702-1, before raw video instance 702-3 finally begins capture right before capturing audible feature 708-3 near the top of FIG. 7.

Based on the audible feature 708 identified with respect to each raw video instance 702, system 100 may form a plurality of image sets by associating together one raw image from every raw video instance 702 (e.g., a raw image captured at a same temporal offset from the audible feature 708 identified with respect to each respective raw video instance 702) into each image set in the plurality of image sets. For example, as shown in FIG. 8, the audible feature 708 identified with respect to each raw video instance 702 may be aligned (i.e., as illustrated at the top of FIG. 8) by trimming off (i.e., discarding or otherwise ignoring) portions of each raw video instance 702 that occurred prior to audible feature 708 or to the earliest portion of raw video instances 702 that may be temporally synchronized based on audible feature 708.

As used herein, "concurrently-captured video data" may refer to video data captured by different video capture devices during roughly a same period of time. Accordingly, raw video instances 702 may be considered to contain concurrently-capture video data because substantial portions of video data of raw video instances 702 were captured during the same period of time. More particularly, a bracket 802 illustrates an extent of the video data of raw video instances 702 that were captured concurrently for all six raw video instances 702. Specifically, as illustrated by bracket 802, concurrently-captured video may begin when the last video capture device is powered on and begins capturing video data (i.e., the first moment when all of the video capture devices capture the same audible feature 708), and may end when the first video capture device is powered off or otherwise stops capturing video data (i.e., as illustrated by the dark line at the bottom of raw video instance 702-4 and the corresponding dark lines at the bottom of the other raw video instances 702).

As shown in FIG. 8, during the period when all of raw video instances 702 represent concurrently-captured video (i.e., illustrated by bracket 802), a plurality of raw images 804 (i.e., video frames that include corresponding audio) may be aligned for each of the raw video instances 702. In other words, all the raw images 804 labeled with a '1' on the top row (directly after audible feature 708 is identified) may be associated together into one image set because each of these raw images 804 is captured simultaneously (or substantially simultaneously) at a same temporal offset from audible feature 708 as every other raw image in the set. Similarly, all the raw images 804 labeled with a '2' may be associated together into a second image set, the raw images 804 labeled with a '3' may be associated together into a third image set, and so forth. One particular image set 806 that includes the raw images 804 labeled with a '4' is explicitly circled in FIG. 8 to illustrate the type of association being performed with respect to the temporal synchronizing of raw video instances 702.

Returning to FIG. 6, once the concurrently-captured video data of each raw video instance (i.e. the data indicated by bracket 802 of raw video instances 702) has been temporally synchronized to form a plurality of images sets (e.g., including image set 806 and/or the other images sets shown in FIG. 8), the video generation system may proceed with method 600 to perform operation 606. In operation 606, the video generation system may read (e.g., load into memory or otherwise access) data related to a particular image set such as image set 806. In particular, the individual raw image within the particular image set may be loaded and prepared for processing in accordance with one or more of the operations of method 600 described below.

In operation 608, the video generation system may identify one or more visual features within each raw image of a particular image set. For example, system 100 may identify a visual feature within both a first raw image of a particular image set (e.g., image set 806) and a second raw image of the particular image set. As explained above, while only one feature shared between two raw images in a particular image set may be described herein for clarity, it will be understood that a large number of visual features (e.g., hundreds or thousands of visual features or more) may be identified across some or all of the raw images in the particular image set in certain implementations.

Figure 9:
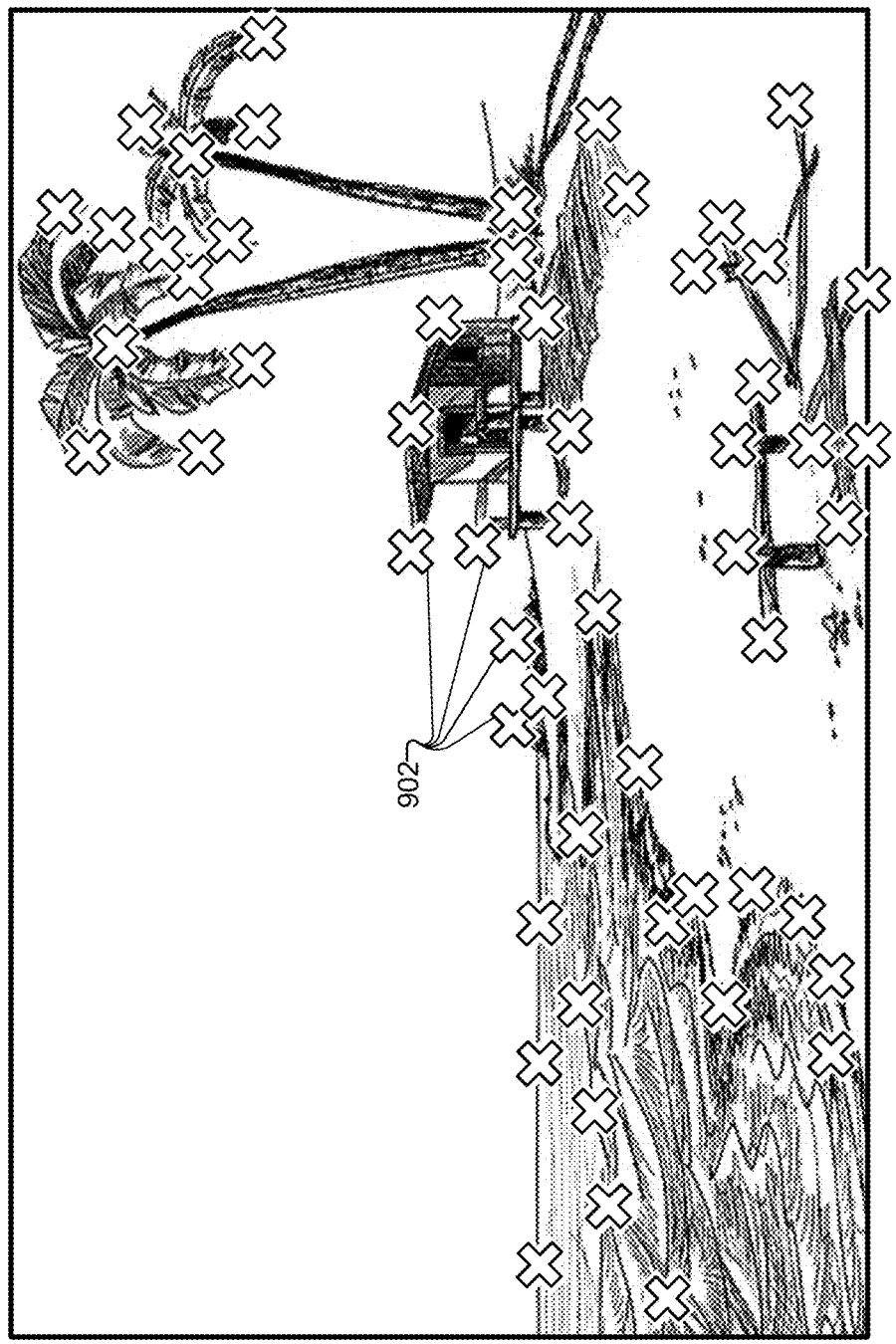
FIG. 9 illustrates a plurality of exemplary visual features identified within an exemplary raw image according to principles described herein.

For example, FIG. 9 illustrates a plurality of exemplary visual features identified within an exemplary raw image 900. As shown in FIG. 9, dozens of visual features 902 (signified by an "X" in FIG. 9) may be identified within raw image 900. Each visual feature 902 may represent a distinct feature that may be recognized within raw image 900 and/or that may be relatively easily recognized and/or otherwise identified in another raw image that at least partially overlaps with raw image 900. For example, some of visual features 902 illustrated in FIG. 9 include areas of high contrast (e.g., between the sea and the sky, between the sea and the sand, at the edges of shadows on the beach, etc.), corners or other borders of objects (e.g., corners of the palm trees, corners and edges of the beach shack, etc.), and the like. Feature identification for a raw image such as raw image 900 may be performed in any way or using any tools or algorithms as may serve a particular implementation.

Returning to FIG. 6, the video generation system may also perform operation 610. For example, operation 610 may be performed prior to, subsequent to, or concurrently with the identification of visual features within the raw images of the particular image set performed in operation 608. In operation 610, the video generation system may undistort (e.g., flatten) the raw images (e.g., the first and second raw images, as well as some or all of the other raw images) of the particular image set read in operation 606 in order to generate respective undistorted images corresponding to each of the raw images (i.e., a first undistorted image corresponding to the first raw image, a second undistorted image corresponding to the second raw image, etc.).

As described above, the raw video instances may be "raw" in the sense that the video data included within the raw video instances has not been pre-processed or pre-synchronized. Thus, in certain examples, this absence of pre-processing may result in raw images being distorted based on, for example, the optics and/or other characteristics of the video capture devices that captured the raw images. For example, a video capture device used to capture a particular raw video instance that includes a particular raw image may include a wide angle lens (e.g., a fisheye lens) and/or other characteristics that distort the raw images captured by the video capture device in a particular way.

In certain examples, the distortion applied by a particular video capture device (e.g., a particular model of video capture device, a video capture device with a particular lens or type of lens, etc.) may be consistent, predictable, quantifiable, and/or reversible. For example, a camera lens used for capturing video images may introduce lens distortion that may be manifested by, for example, straight lines appearing to be curved in particular parts of the video images. Such distortion may be modeled using distortion coefficients that incorporate radial and/or tangential distortion factors that mathematically describe how to convert a raw image into an undistorted (e.g., rectilinear) image. Accordingly, camera distortion coefficients for each particular lens type, video capture device type (e.g., video capture device model), etc., may be determined (e.g., estimated) as part of a one-time calibration process performed for each of various types of lenses and/or video capture devices supported by system 100. Examples of distortion coefficients that may be determined by a one-time calibration process may include, for instance, radial distortion coefficients, lens distortion coefficients, and/or other distortion coefficients as may be used to fully quantify and/or characterize the distortion applied by a particular lens or video capture device on raw images captured by the particular lens or video capture device. In some examples, the calibration process may involve capturing raw images of known patterns (e.g., distorted checkerboard patterns, etc.) and determining how the known patterns are distorted by the particular video capture device or lens.

Accordingly, operation 610 may be performed (e.g., to undistort or reverse the distortion applied by a particular video capture device) based on at least one distortion coefficient associated with one or more of the video capture devices (e.g., the video capture device used to capture the particular raw image being undistorted). For example, system 100 may store distortion coefficients associated with various supported video capture devices within storage facility 108 and apply at least one of the distortion coefficients in order to perform operation 610.

Once at least one visual feature has been identified on at least a first and a second raw image in operation 608 and the first and second raw images have been undistorted in operation 610, operation 612 may be performed. In operation 612, the video generation system may map the visual feature identified within both the first and the second raw images of the particular image set to both the first and the second undistorted images, respectively. For example, operation 612 may be performed based on the same distortion coefficients determined during the one-time calibration process described above in relation to operation 610.

Figure 10:
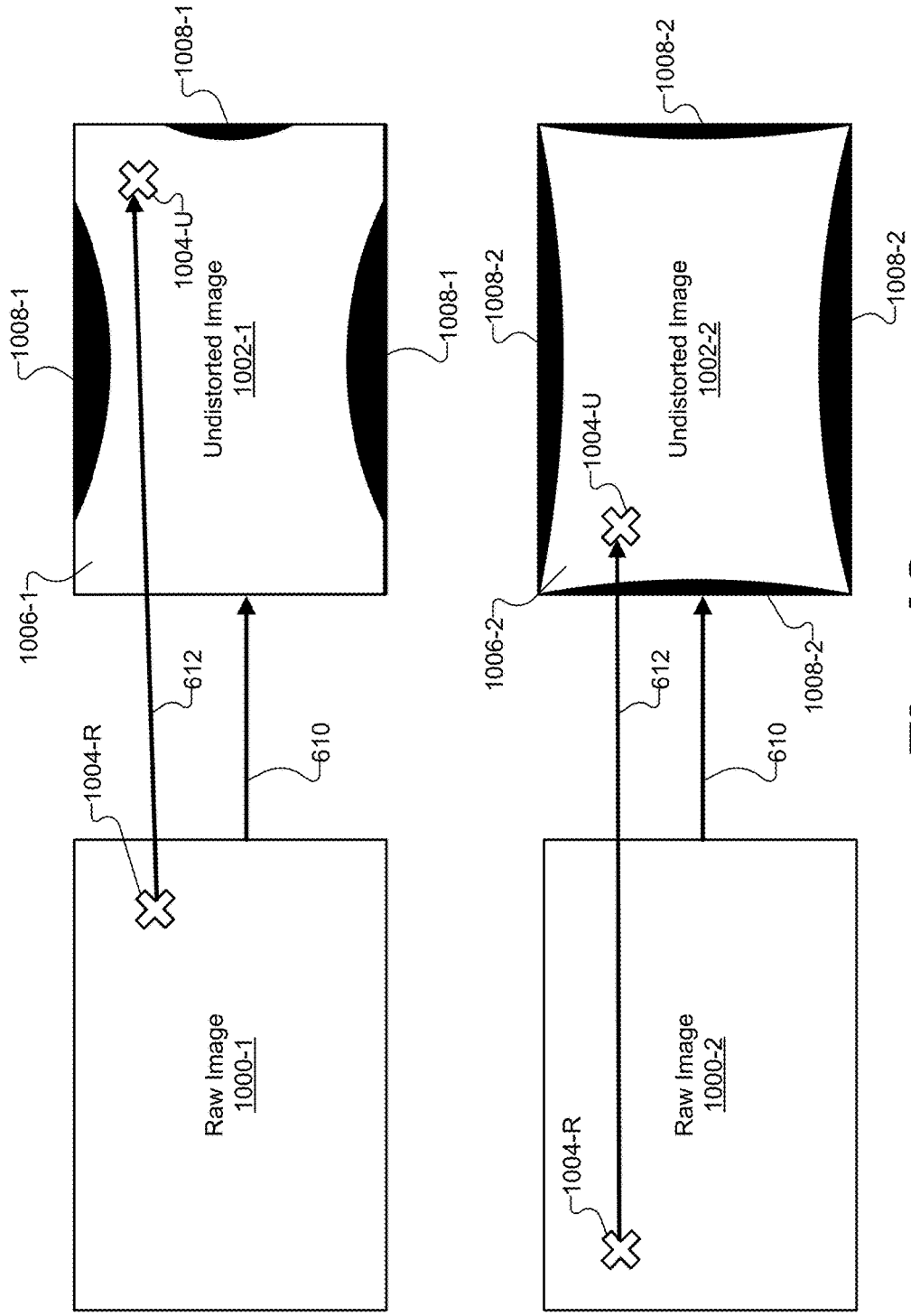
FIG. 10 illustrates exemplary operations performed by the video generation system of FIG. 1 in which raw images are undistorted to generate undistorted images and visual features of the raw images are mapped onto the undistorted images according to principles described herein.

To illustrate, FIG. 10 shows exemplary operations 610 performed by system 100 in which raw images 1000 (i.e., raw images 1000-1 and 1000-2) are undistorted to generate undistorted images 1002 (i.e., undistorted images 1002-1 and 1002-2). Additionally, FIG. 10 shows exemplary operations 612 performed by system 100 in which a visual feature 1004 is mapped from raw images 1000 (i.e., visual feature 1004-R, the "R" standing for "Raw") onto respective undistorted images 1002 (i.e., as visual feature 1004-U, the "U" standing for "Undistorted"). In FIG. 10, raw images 1000 may be overlapping raw images from a particular image set (e.g., image set 806 of FIG. 8). While each of raw images 1000 may include a large number of visual features that may be identified by system 100 (e.g., during operation 608, as illustrated by FIG. 9), visual feature 1004 may be representative of one particular feature that is identified on both raw images 1000 and, as will be described and illustrated below, may be used to help align and stitch together images based on raw images 1000 into a stitched image.

As shown, raw images 1000 may be captured according to one particular shape (e.g., a rectangle having a particular aspect ratio, as illustrated in FIG. 10), while undistorted images 1002 may take a different shape than the original shape of raw images 1000. This is because all or part of raw images 1000 may be stretched, compressed, or otherwise altered as part of the process of undistorting raw images 1000. Accordingly, as illustrated in FIG. 10, operations 610 (i.e., the undistorting of raw images 1000-1 and 1000-2 to generate undistorted images 1002-1 and 1002-2, respectively) may include masking undistorted images 1002 by differentiating one or more regions of undistorted images 1002 that derive from raw images 1000, respectively, from one or more regions of undistorted images 1002 that are artifacts of operations 610 (i.e., the undistorting of raw images 1000), and by applying a mask to only the one or more regions of undistorted images 1002 that derive from raw images 1000 and not to the one or more regions of undistorted images 1002 that are artifacts of the undistorting of raw images 1000. For example, as shown in FIG. 10, a mask may be applied to one or more regions 1006 (i.e., region 1006-1 of undistorted image 1002-1 and region 1006-2 of undistorted image 1002-2) that derive from raw images 1000-1 and 1000-2, respectively, and may not be applied to one or more regions 1008 (i.e., regions 1008-1 of undistorted image 1002-1 and regions 1008-2 of undistorted image 1002-2) that are artifacts of the undistorting of raw images 1000-1 and 1000-2, respectively.

As shown, the undistorting performed for each of operations 610 may be distinct for each raw image 1000, resulting in different patterns of regions 1006 and regions 1008 in each respective undistorted image 1002. For example, if each raw image 1000 is captured by a different video capture device, a different lens, etc., the distortion coefficients used to undistort each raw image 1000 in operations 610 may be different and may result in different masking patterns as illustrated by the differences in shape between regions 1006-1 and 1006-2, and between regions 1008-1 and regions 1008-2. The masking performed for each of operations 610 and the regions illustrated in undistorted images 1002 will be understood to be exemplary only. Any suitable masking and regions of any suitable shape may be employed as may serve a particular embodiment.

In certain examples, operations 612 (i.e., the mapping of visual feature 1004-R to visual feature 1004-U) may be further based on the masking of undistorted images 1002. Additionally, the camera registration parameter data may include data representative of the mask applied to only regions 1006 of undistorted images 1002 that derive from raw images 1000 and not to regions 1008 of undistorted images 1002 that are artifacts of the undistorting of raw images 1000.

Additionally, as illustrated in FIG. 10, while operations 612 may be based upon operations 610 such that operations 612 may only be performed subsequent to operations 610, operations 610 and 612 may each be performed in parallel (i.e., concurrently) on different images within an image set. For example, both operations 610 illustrated in FIG. 10 (i.e., the undistorting of raw image 1000-1 and the undistorting of raw image 1000-2) may be performed concurrently along with, for example, the undistorting of other raw images within an image set of raw images 1000 that are not shown. Similarly, both operations 612 illustrated in FIG. 10 (i.e., the mapping of visual feature 1004-R to visual feature 1004-U on undistorted images 1002-1 and 1002-2), may be performed concurrently along with, for example, the mapping of other visual features onto undistorted images 1002 or onto other undistorted images derived from raw images included within the image set that includes raw images 1000 (not shown).

Returning to FIG. 6, in operation 614, the video generation system (i.e., system 100) may match (e.g., correlate, associate, link, etc.) the visual feature mapped to the first undistorted image with the visual feature mapped to the second undistorted image. More particularly, system 100 may match visual feature 1004-U of undistorted image 1002-1 with visual feature 1004-U of undistorted image 1002-2 based on operations 612 (i.e., the mapping of visual feature 1004-R of raw images 1000 to visual feature 1004-U on each of undistorted images 1002, as described above in relation to FIG. 10). The matching of the visual feature performed in operation 614 will be illustrated and described in more detail below in relation to FIG. 11.

Then, based on operation 614, system 100 may perform an operation 616 in which system 100 determines a relative rotation of a first video capture device and a second video capture device both from the plurality of video capture devices, the first video capture device having captured raw image 1000-1 and the second video capture device having captured raw image 1000-2. For example, operation 616 may be performed based on the masking of undistorted images 1002 in operation 610 and on the matching of visual feature 1004 in operation 614.

Figure 11:
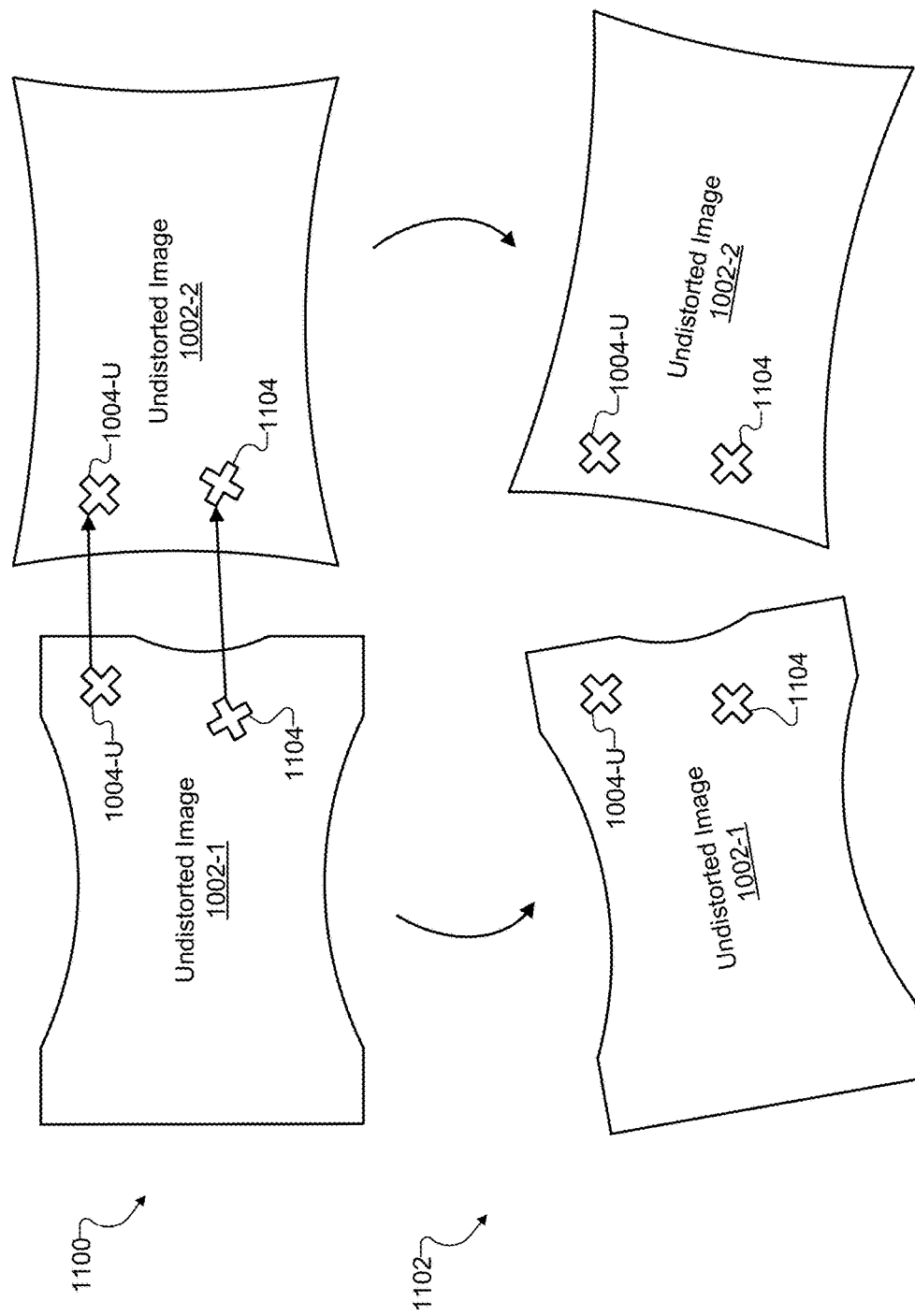
FIG. 11 illustrates exemplary operations performed by the video generation system of FIG. 1 in which undistorted images are rotated and visual features mapped to the undistorted images are matched according to principles described herein.

To illustrate, FIG. 11 shows exemplary operations performed by system 100 in which undistorted images 1002-1 and 1002-2 are rotated and visual features mapped to undistorted images 1002 are matched. Specifically, FIG. 11 illustrates a feature match 1100 resulting from system 100 performing operation 614 and an image rotation 1102 resulting from system 100 performing operation 616.

As illustrated, in feature match 1100, visual features may be matched between undistorted images 1002-1 and 1002-2 according to operation 614. System 100 may match visual features between undistorted images 1002 in any suitable way. For example, system 100 may employ a feature matching algorithm (e.g., an algorithm employing random or pseudorandom numbers) to attempt to match one or more visual features between undistorted images 1002 including, for example, visual feature 1004-U. Based on the matching of the one or more visual features (e.g., including visual feature 1004-U), system 100 may determine a confidence level associated with the matching of the one or more visual features (i.e., associated with feature match 1100). For example, system 100 may determine the confidence level based on how similar the matched visual features identified in one undistorted image are to the visual features identified in other undistorted images, whether each of the undistorted images expected to include a particular visual feature actually does include the particular visual feature, the extent to which identified visual features are consistently positioned with respect to one another in different undistorted images, and/or any other factors as may serve a particular implementation.

In some examples, a confidence level of feature match 1100 may be determined and compared to a predetermined confidence level threshold. Only if the confidence level of feature match 1100 meets or exceeds the predetermined threshold will system 100 proceed from operation 614 (i.e., feature match 1100) to operation 616 (i.e., image rotation 1102). Conversely, if the confidence level of feature match 1100 fails to meet the predetermined threshold, system 100 may reattempt to perform operation 614 by identifying one or more additional and/or alternative visual features including, for example, a visual feature 1104. System 100 may reanalyze the confidence level of feature match 1100 using the one or more additional and/or alternative visual features (e.g., including visual feature 1104) to determine if the confidence level of feature match 1100 now meets or exceeds the predetermined threshold or if yet another attempt to successfully perform operation 614 (i.e., feature match 1100) is to be made.

Figure 13:
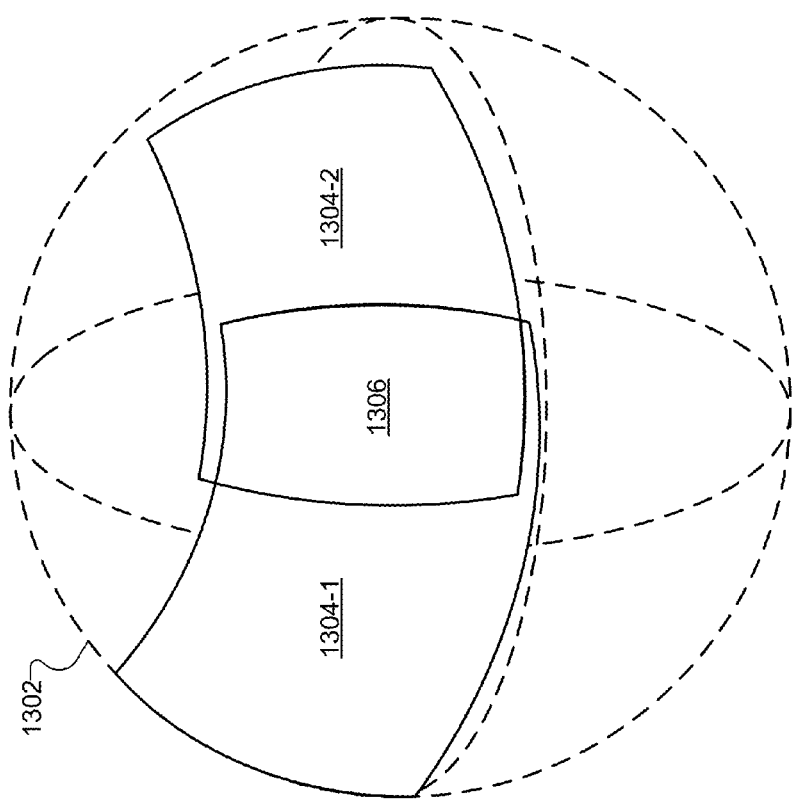
FIG. 13 illustrates exemplary operations performed by the video generation system of FIG. 1 in which undistorted images are warped to contour to a three-dimensional framework and composited onto a particular area of the three-dimensional framework according to principles described herein.

Once system 100 determines that the confidence level of feature match 1100 meets or exceeds the predetermined confidence level threshold, operation 616 (i.e., image rotation 1102) may be performed. As illustrated in FIG. 11, in operation 616, undistorted images 1002 may be rotated relative to one another such that, when the images are later warped and composited onto a 3D framework (as will be described below, and as illustrated in FIG. 13), visual features identified in feature match 1100 (e.g., including visual features 1004-U and/or 1104) will align. Image rotation 1102 may be performed in any suitable way. For example, image rotation 1102 may be performed based on the masking of undistorted images 1002 (i.e., the masking performed as part of operation 610) and/or based on the matching of visual features 1004-U and 1104 between undistorted images 1002 (i.e., feature match 1100).

Returning again to FIG. 6, system 100 may now proceed to perform operation 618, in which system 100 may determine camera registration parameter data based on any of the previous operations of method 600 (e.g., the matching and/or relative rotation estimation of operations 614 and/or 616). The camera registration parameter data may be representative of the plurality of video capture devices and/or the static configuration in which the plurality of video capture devices is located. For example, the camera registration parameter data may include intrinsic parameters representative of at least one characteristic of each video capture device in the plurality of video capture devices, and extrinsic parameters representative of a relative positioning of each video capture device in the plurality of video capture devices with respect to other video capture devices in the plurality of video capture devices.

As will be illustrated below, intrinsic parameters represented by the camera registration parameter data may include any parameters, coefficients, or other data representative of characteristics of one or more of the video capture devices in the plurality of video capture devices. For example, intrinsic parameters may represent a principal point or center location of a particular video capture device (e.g., using a local coordinate system specific to the video capture device or a world coordinate system that is shared by all of the video capture devices), a focal length of the particular video capture device, an image sensor format, lens distortion parameters, and/or any other parameters or data representative of video capture device characteristics as may serve a particular implementation.

Extrinsic parameters represented by the camera registration parameter data may include any parameters, coefficients, or other data representative of the relative position of each video capture device with respect to the other video capture devices. For example, extrinsic parameters may designate transformations from a world coordinate system (i.e., a coordinate system universal to all of the video capture devices) to a local coordinate system specific to a particular video capture device. As such, extrinsic parameters may represent a center location of each video capture device in the world coordinate system, as well as a rotation matrix indicative of the relative rotation of each video capture device, and any other parameters or data representative of the relative positions of the video capture devices as may serve a particular implementation.

The camera registration parameter data determined in operation 618 may include any data and may be formatted, stored, represented, transmitted, etc., in any way as may serve a particular implementation. For example, camera registration parameter data may be represented in a file that employs a markup language such as XML. Additionally, undistortion-related masking data, video capture device calibration data, and/or any other data related to or derived from operations described above may be included in camera registration parameter data along with or as a part of intrinsic and extrinsic parameters included within the camera registration parameter data.

Returning to FIG. 6, once camera registration parameter data has been successfully determined in operation 618, system 100 may proceed to perform operations 620 and 622. However, in certain examples, before proceeding to perform operations 620 or 622, system 100 may determine that the camera registration parameter data determined in operation 618 is invalid and, as a result, may loop back, as illustrated by arrows 624 (i.e., arrows 624-A and 624-B), to either repeat operation 608 using a different algorithm that may identify different visual features (e.g., visual features from which valid camera registration parameter data may be more likely to be derived), or to repeat an entire camera registration process 626 in an attempt to determine valid camera registration parameter data. For example, it may turn out that the particular image set selected in operation 606 may include one or more raw images for which visual features are difficult or impossible to identify, or for which one or more other operations of camera registration process 626 are difficult or impossible to perform. For instance, if the particular image set includes one or more pictures that are very dark (i.e., poorly lit) or featureless (e.g., such as a homogenous blue sky), certain operations of camera registration process 626 (e.g., operations 608, 612, 614, 616, etc.) may be difficult or impossible to perform accurately and, as a result, may fail. Consequently, in operation 618, valid camera registration parameter data may be difficult to determine based on the processing of that particular image set.

To remedy a failure to determine valid camera registration parameter data, system 100 may return to operation 608 as illustrated by arrow 624-A to reattempt to identify visual features (e.g., additional or alternative visual features that may be more likely to result in valid camera registration parameter data). For example, operation 608 may identify visual features using a different algorithm than was used to identify features previously in order to identify different (i.e., additional, alternative, etc.) visual features. The loop back to operation 608 illustrated by arrow 624-A may be performed as many times as may serve a particular implementation.

In certain examples, particularly if valid camera registration parameter data has not been successfully determined after one or more attempts to loop back to operation 608 via arrow 624-A, system 100 may return to operation 606 as illustrated by arrow 624-B to select and read in a different image set. System 100 may then repeat the operations included within camera registration process 626 as described above to attempt again to determine valid camera registration parameter data. As shown, camera registration process 626 may include at least the identifying of the visual feature within both the first and second raw images of the particular image set (i.e., operation 608), the undistorting of the first and second raw images of the particular image set (i.e., operation 610), the mapping of the visual feature identified within both the first and the second raw images of the particular image set to both the first and the second undistorted images (i.e., operation 612), and the matching of the visual feature mapped to the first undistorted image with the visual feature mapped to the second undistorted image (i.e., operation 614). Accordingly, method 600 may involve, prior to a successful performing of camera registration process 626 with respect to one particular image set, making one or more attempts by system 100 to perform camera registration process 626 with respect to one or more additional image sets within the plurality of image sets, and determining that the one or more attempts to perform the camera registration process with respect to the one or more other image sets each fails to determine valid camera registration parameter data. In other words, camera registration process 626 may loop and repeat for as many different image sets as may be required to determine valid camera registration parameter data. In some examples, this may be achieved in relatively few (e.g., only one) loops while in other examples, a relatively large number of loops (e.g., up to and including a loop for every image set in the plurality of image sets in the concurrently-captured video) of camera registration process 626 may be performed in order to determine valid camera registration parameter data.

Once valid camera registration parameter data has been determined in operation 618, system 100 may proceed to operation 620. In operation 620, system 100 may perform a video stitching process (e.g., the video stitching process described below in relation to FIG. 12) for the particular image set from which the valid camera registration parameter data has been derived. In other words, before proceeding to stitch each image set (e.g., each frame of the stitched video content) together in operation 622, system 100 may perform a "test run" for a single image set (i.e., the particular image set) to further verify the camera registration parameter data and to otherwise validate the video stitching process.

After performing the video stitching process on the particular image set to generate a single stitched test frame, system 100 may validate the video stitching process in any suitable way. For example, system 100 may perform one or more tests with respect to the stitched test frame to ensure that the stitched test frame is formatted correctly, meets certain predetermined thresholds, and the like. As one example, system 100 may validate a format of the stitched test frame to verify, for example, that an aspect ratio of the stitched test frame is correct. If the stitched frame represents a 360° by 180° spherical image, for instance, system 100 may verify that the aspect ratio of the stitched frame is 2:1. As another example, system 100 may determine that a number or a percentage of "black pixels" (i.e., erroneous pixels represented by meaningless data, no data, etc.) within the stitched frame meets or is below a predetermined threshold. For example, in one implementation, system 100 may ensure that fewer than 0.05% of all of the pixels in the stitched test frame are black pixels.

As shown in FIG. 6, to the extent that one or more of the validation tests performed in operation 620 fail or otherwise indicate a problem with the stitched test frame, system 100 may loop back to operation 608 (i.e., via arrow 624-A) to attempt to identify additional and/or alternative visual features using a different algorithm and/or to operation 606 (i.e., via arrow 624-B) to repeat camera registration process 626 in its entirety as described above.

Figure 12:
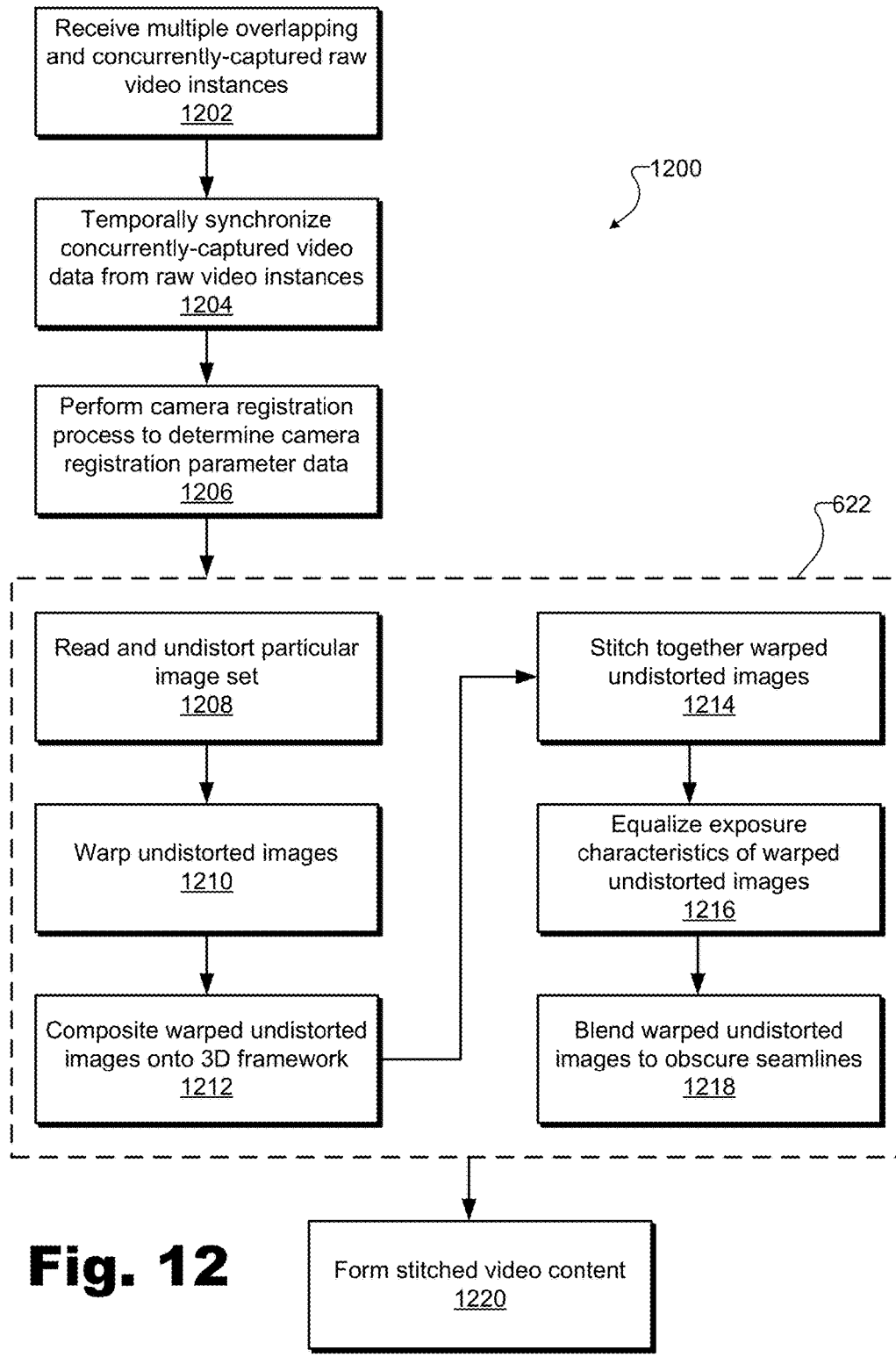
FIG. 12 illustrates an exemplary method for generating stitched video content from multiple overlapping and concurrently-captured video instances according to principles described herein.

Once valid camera registration parameter data has been determined in operation 618 and a test frame has been validated in operation 620, system 100 may proceed to operation 622 to form stitched video content by performing the validated video stitching process on each image set based on the validated camera registration parameter data. To illustrate, FIG. 12 shows an exemplary method 1200 for generating stitched video content from multiple overlapping and concurrently-captured video instances. In particular, as mentioned above, method 1200 illustrates how stitched video content may be generated from multiple overlapping and concurrently-captured video instances with particular attention focused on a video stitching process that will be described in relation to FIG. 12 and other figures related to FIG. 12. While FIG. 12 illustrates exemplary operations according to one embodiment, other embodiments may omit, add to, reorder, and/or modify any of the operations shown in FIG. 12. One or more of the operations shown in FIG. 12 may be performed by system 100 and/or any implementation thereof.

In operation 1202, a video generation system such as system 100 may receive a plurality of raw video instances from a plurality of video capture devices located in a static configuration with respect to one another such that video capture devices in the plurality of video capture devices collectively capture a scene. For example, each raw video instance in the plurality of raw video instances may include video data that partially overlaps with video data from at least one other raw video instance in the plurality of raw video instances and that is concurrently captured with video data from all of the other raw video instances in the plurality of raw video instances. Operation 1202 may be performed in any of the ways described herein. For example, operation 1202 may be operated identically or in a similar way as described above for operation 602 of FIG. 6.

In operation 1204, the video generation system may temporally synchronize the concurrently-captured video data of each raw video instance in the plurality of the raw video instances to form a plurality of image sets. For example, each image set in the plurality of image sets may include a raw image from each raw video instance in the plurality of raw video instances, wherein all of the raw images within each image set in the plurality of image sets are captured simultaneously. Operation 1204 may be performed in any of the ways described herein. For example, operation 1204 may be operated identically or in a similar way as described above for operation 604 of FIG. 6 to generate a plurality of image sets such as those illustrated in FIG. 8 (i.e., including image set 806).

In operation 1206, the video generation system may determine camera registration parameter data representative of the plurality of video capture devices and the static configuration in which the plurality of video capture devices is located. For example, operation 1206 may be performed based on a camera registration process performed with respect to at least one image set in the plurality of image sets. Operation 1206 may be performed in any of the ways described herein. For example, operation 1206 may include some or all of the operations included within camera registration process 626 in FIG. 6 or operations analogous or similar to such operations. More specifically, operation 1206 may be performed by looping through camera registration process 626 one or more times as described above until valid camera registration parameter data may be determined.

As mentioned above with respect to FIG. 6, after camera registration process 626 has been performed successfully to determine valid camera registration parameter data based on a particular image set in the plurality of image sets, operation 622 may be performed on each and every image set in the plurality of image sets to form stitched video content. FIG. 12 details an exemplary way that operation 622 may be implemented. For example, as shown in FIG. 12, operation 622 may include operations 1208, 1210, 1212, 1214, 1216, and 1218, which may each be performed in the order shown or in any other suitable order as may serve a particular implementation.

In certain implementations, one or more of the operations included within operation 622 may be dependent upon another operation included within operation 622 and may be performed only after the other operation has been performed. In the same or other implementations, however, certain operations included within operation 622 may be performed concurrently with (i.e., at the same time as, in parallel with, independently from, etc.) other operations included within operation 622. As a result, operation 622 may be optimized (e.g., pipelined) to concurrently perform as many of the operations shown in FIG. 12 as possible to increase the efficiency of method 1200 and/or decrease the amount of time and/or processing performed in order to generate stitched video content.

The increased efficiency (e.g., in resource usage, processing power, etc.) and the decreased processing time made is possible by optimizing the pipeline of operation 622 described herein and may be particularly useful in situations where the plurality of raw video instances received from the plurality of video capture devices are real-time video streams (e.g., live or near-live video streams). For example, the video capture devices may be set up and configured to stream raw, real-time video streams capturing a real-world event (e.g., a sporting event, a concert, a live news broadcast, etc.) that may be unfolding in real time. Accordingly, methods and systems for generating stitched video content from multiple overlapping and concurrently-captured video instances described herein may thus be employed such that the video stitching process may be performed in real time as the plurality of raw video instances are received from the plurality of video capture devices.

System 100 may perform a video stitching process for each particular image set in the plurality of image sets (i.e., every image set generated in operation 1204) by performing the operations illustrated within exemplary operation 622 in FIG. 12 with respect to every image set. Thus, while not explicitly shown in FIG. 12, it will be understood that the operations within exemplary operation 622 may be performed in a loop, as part of a pipeline, and/or otherwise may be repeated with respect to each and every image set in order to generate each and every respective frame of stitched video content that may be formed and output by the system (e.g., as part of operation 1220). Each of the operations shown in FIG. 12 that may be performed and repeated as a part of the video stitching process (i.e., as part of exemplary operation 622) will now be described in more detail. As with FIG. 6 and other figures described above, a first and a second raw image may be described and illustrated within FIGS. 12 through 14 for the sake of clarity, but it will be understood that the operations described below may be performed on any and/or every image or combination of images within a particular image set as may serve a particular implementation.

In operation 1208, the video generation system may read (e.g., load into memory or otherwise access) data related to a particular image set (e.g., such as image set 806 illustrated in FIG. 8) and/or may undistort a first raw image of the particular image set and a second raw image of the particular image set that overlaps the first raw image to generate a first undistorted image corresponding to the first raw image and a second undistorted image corresponding to the second raw image. Operation 1208 may be performed in any of the ways described herein. For example, operation 1208 may read the particular image set in the same way described above in relation to operation 606 of FIG. 6 and may undistort the respective raw images of the particular image set (e.g., the first and second raw images, as well as other raw images within the particular image set) in the same way described above in relation to operation 610 of FIG. 6. Operation 1208 may be performed based on at least one distortion coefficient associated with the plurality of video capture devices. For example, the at least one distortion coefficient may be stored in a storage facility (e.g., storage facility 108) by a calibration process performed on the video capture devices. The at least one distortion coefficient may be stored as a part of or separately from the camera registration parameter data determined in operation 1206 (e.g., which may be stored in camera registration parameter data 112 of storage facility 108 in system 100).

In operation 1210, video generation system may warp, based on the camera registration parameter data (e.g., stored within camera registration parameter data 112), the first and the second undistorted images to contour to a three-dimensional framework. Similar to the undistorting performed on raw images (e.g., raw images 1000 of FIG. 10) in operation 1208 to remove the effects that the lens (e.g., a wide-angle lens) or other characteristics of the video capture device may have had on capturing the raw images (e.g., to flatten the raw images into undistorted images such as undistorted images 1002 of FIG. 10), operation 1210 may be performed by remapping pixels to add distortions to a flattened undistorted image to make the image conform to a three dimensional framework, such as a sphere, a cylinder, a pyramid, or the like. Accordingly, because operations 1208 and 1210 are both similar pixel remapping operations, in certain examples, the undistorting of the raw image in operation 1208 and the warping of the undistorted image in operation 1210 may be combined into a single operation (e.g., involving a single transformation or a single equation or the like) such that raw images may be converted directly into warped undistorted images (i.e., warped images that contour to the three-dimensional framework) without an intermediate step in which undistorted images that do not contour to the three-dimensional framework (e.g., flattened undistorted images) are generated.

In operation 1212, the video generation system may composite the warped first and second undistorted images onto a particular area of the three-dimensional framework such that the warped first and second undistorted images overlap with one another in accordance with the camera registration parameter data to form an overlapping region. For example, operation 1212 may be performed based on the camera registration parameter data determined in operation 1206.

To illustrate, FIG. 13 shows operations 1210 and 1212 being performed by system 100 to warp undistorted images to contour to a three-dimensional framework and to composite the undistorted images onto a particular area of the three-dimensional framework. More specifically, as shown, a three-dimensional framework 1302 may be a spherical framework in FIG. 13, and two undistorted images 1304 (i.e., undistorted images 1304-1 and 1304-2) may be warped to contour to framework 1302.

In certain examples, the warping of undistorted image 1304-1 may be performed concurrently with the warping of undistorted image 1304-2 and the concurrent warping of both undistorted images may be performed based on intrinsic parameters included within the camera registration parameter data. For example, the intrinsic parameters may be representative of at least one characteristic of a first video capture device in the plurality of video capture devices (e.g., a video capture device that captured the first raw image) and at least one characteristic of a second video capture device in the plurality of video capture devices (e.g., a video capture device that captured the second raw images). Additionally, as mentioned above, while framework 1302 is illustrated as a spherical framework, various other three-dimensional frameworks based on cubes, cylinders, pyramids, rectangular prisms, elliptical prisms, and/or other suitable shapes may be used as may serve a particular implementation.

As further illustrated in FIG. 13, undistorted images 1304 may be composited onto a particular area of framework 1302 such that undistorted images 1304 overlap with one another in accordance with the camera registration parameter data to form an overlapping region 1306. For example, undistorted images 1304 may be composited onto framework 1302 to overlap with a relative rotation in such a way that some or all of the visual features of each undistorted image 1304 may align properly based on the camera registration parameter data determined by the camera registration process even if the visual features of the raw images of the particular image set of undistorted images 1304 are not specifically identified, mapped, matched, or the like. In other words, because valid camera registration parameter data may represent all the information needed to properly position, align, and otherwise composite undistorted images onto a three-dimensional framework, the processing-intensive operations performed during the camera registration process may not need to be repeated for each and every image set once valid camera registration parameter data have been determined.

In certain examples, the compositing of undistorted images 1304-1 and 1304-2 onto the particular area of framework 1302 may be performed based on extrinsic parameters included within the camera registration parameter data. For example, the extrinsic parameters may be representative of a relative positioning of a first video capture device in the plurality of video capture devices (e.g., the video capture device that captured the first raw image) and with respect to a second video capture device in the plurality of video capture devices (e.g., the video capture device that captured the second raw image). The compositing of undistorted images 1304-1 and 1304-2 onto the particular area of framework 1302 in operation 1212 may be performed by rotating undistorted images 1304-1 and 1304-2 based on the extrinsic parameters, and aligning undistorted image 1304-1 with undistorted image 1304-2 based on the extrinsic parameters to form overlapping region 1306. While only two undistorted images 1302 are illustrated in FIG. 13, it will be understood that a plurality of other undistorted images may also be warped and composited onto framework 1302 such that, for example, all the warped undistorted images overlap to cover the entirety of framework 1302.

In certain examples, system 100 may identify a problem during the compositing of operation 1212, and, as a result, may be configured to return (i.e., loop back) to operation 1206 to attempt once again to determine valid camera registration parameter data. For example, if system 100 determines that at least a predetermined percentage (e.g., 1%, 0.1%, etc.) of the area of framework 1302 has not been composited with at least one undistorted image, system 100 may determine that the camera registration parameter data determined in operation 1206 is invalid and may perform operation 1206 again to determine new camera registration parameter data based on the current (and/or subsequent) image sets prior to continuing with the video stitching process of operation 622 (i.e., including the compositing of operation 1212).

Returning to FIG. 12, after system 100 has performed operation 1212, system 100 may proceed to operation 1214. In operation 1214, the video generation system may stitch together, along a seam within the overlapping region in which the warped first and second undistorted images overlap on the three-dimensional framework, the warped first and the second undistorted images with respect to the particular area of the three-dimensional framework onto which the warped first and second images are composited. This is illustrated by FIG. 14.

Figure 14:
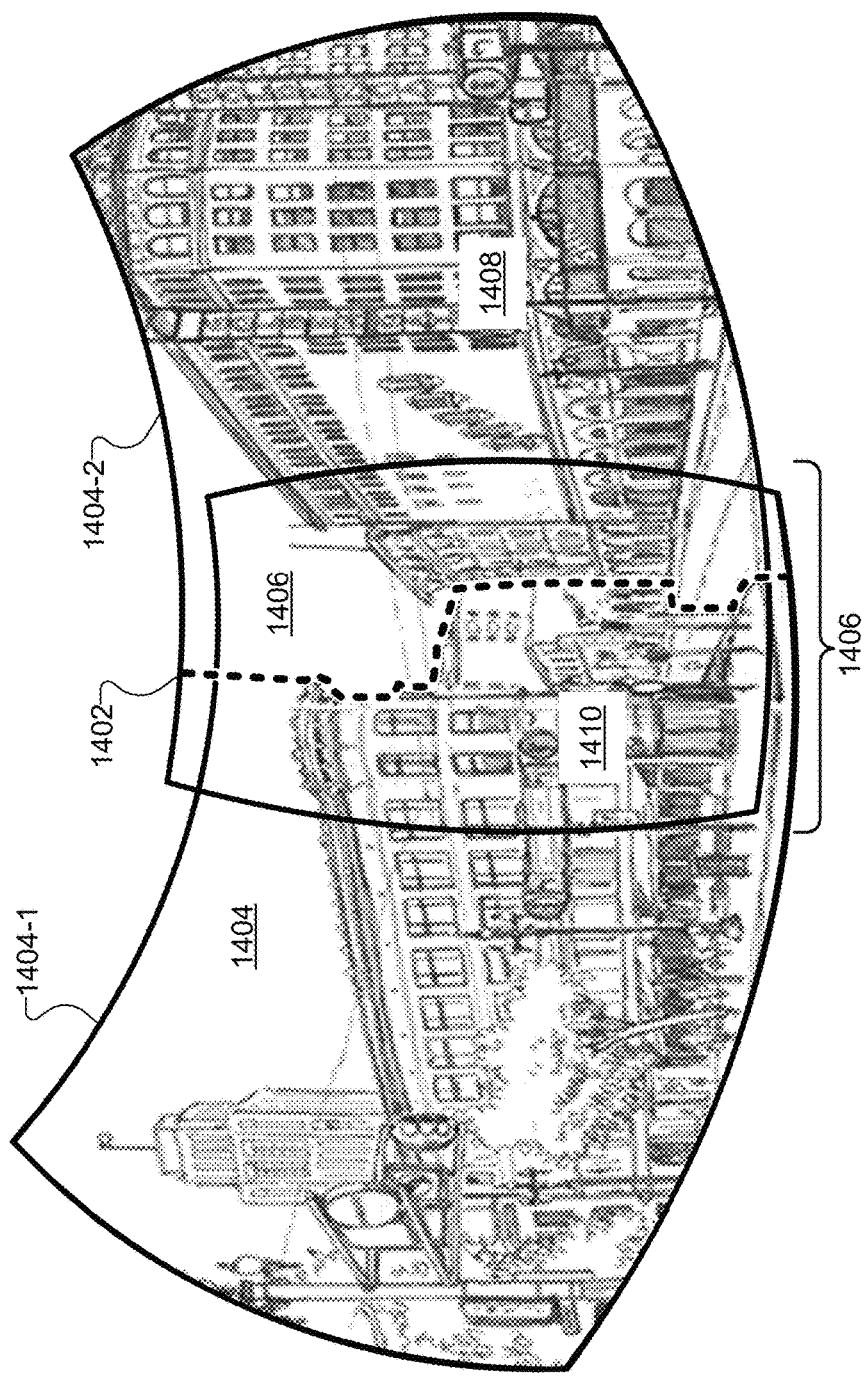
FIG. 14 illustrates exemplary operations performed by the video generation system of FIG. 1 in which images are stitched together with respect to a particular area of a three-dimensional framework according to principles described herein.

FIG. 14 shows how operation 1214 may be performed by system 100. In FIG. 14, undistorted images 1304-1 and 1304-2 are illustrated with more detail to show a street scene represented by the images. As shown, the stitching together of the warped first and second undistorted images (i.e., undistorted images 1304) with respect to the particular area of the three-dimensional framework may include designating a seamline 1402 that spans the overlapping region (i.e., overlapping region 1306) and masking the warped first and second undistorted images. Seamline 1402 may be designated in any way as may serve a particular implementation to run from one side of the overlapping region (e.g., the top of overlapping region 1306) to an opposite side of the overlapping region (e.g., the bottom of overlapping region 1306). In some example, system 100 may designate seamline 1402 so as to be relatively non-intrusive or indiscreet. For example, as illustrated, rather than being a straight line (which may be used in certain implementations or for certain images), seamline 1402 may cut across the overlapping region in accordance with particular characteristics (e.g., visual features) of the image content within the overlapping regions. In other words, seamline 1402 may be designated so as to avoid, to the extent possible, running through the middle of objects or people or otherwise cutting through portions of the overlapping region in which the seamline may be noticeable after the video stitching process is complete.

In order to mask the warped first and second undistorted images, system 100 may differentiate a non-redundant region of the first undistorted image from a redundant region of the first undistorted image, the non-redundant region of the first undistorted image including a region of the first undistorted image on a first side of the seamline and the redundant region of the first undistorted image including a region of the first undistorted image on a second side of the seamline opposite the first side of the seamline. Similarly, system 100 may differentiate a non-redundant region of the second undistorted image from a redundant region of the second undistorted image, the non-redundant region of the second undistorted image including the region of the second undistorted image on the second side of the seamline and the redundant region of the second undistorted image including the region of the second undistorted image on the first side of the seamline. System 100 may then apply a mask to only the non-redundant regions of the first and second undistorted images and not to the redundant regions of the first and second undistorted images.

For example, referring to FIG. 14, system 100 may mask undistorted images 1304-1 and 1304-2 by differentiating a non-redundant region 1404 of undistorted image 1304-1 from a redundant region 1406 of undistorted image 1304-1 (i.e., where non-redundant region 1404 includes a region of undistorted image 1304-1 on the left side of seamline 1402 and redundant region 1406 of undistorted image 1304-2 includes a region of undistorted image 1304-1 on the right side of seamline 1402). Similarly, system 100 may differentiate a non-redundant region 1408 of undistorted image 1304-2 from a redundant region 1410 of undistorted image 1304-2 (i.e., where non-redundant region 1408 includes a region of undistorted image 1304-2 on the right side of seamline 1402 and redundant region 1410 includes a region of undistorted image 1304-2 on the left side of seamline 1402). System 100 may apply the mask to only non-redundant regions 1404 and 1408 of undistorted images 1304-1 and 1304-2, respectively, and not to redundant regions 1406 and 1410 of undistorted images 1304-1 and 1304-2, respectively. Accordingly, the regions of undistorted images 1304 to which the mask is applied may perfectly fit together (e.g., like a jigsaw puzzle) with no overlap and, when combined with similar masked regions of other undistorted images (not explicitly shown in FIG. 14), may entirely cover framework 1302.

Returning to FIG. 12, after stitching together the undistorted images in operation 1214, the video generation system may proceed to perform operation 1216. In operation 1216, the video generation system may equalize an exposure characteristic of the first undistorted image (i.e., undistorted image 1304-1) and an exposure characteristic of the second undistorted image (i.e., undistorted image 1304-2). For example, if the respective video capture devices that captured the raw images upon which undistorted images 1304 are based were set to use different exposure settings or to use auto-exposure settings, the exposure associated with each of the undistorted images may be different, resulting in substantially different colors and other image characteristics being used to represent the same visual features in different images. By adjusting and equalizing the exposure in all of the undistorted images in operation 1216, the colors across the ultimate representation of the scene may appear much more uniform such that there may be fewer or a complete absence of noticeable differences between sections of the scene based on the exposure settings of the video capture device that captured each section. As mentioned above, operation 1216, like other operations described herein, may be performed at any time or in any order with respect to the other operations of method 1200. For example, in certain examples, operation 1216 may be performed prior to the stitching together of operation 1214 and/or prior to the compositing of operation 1212.

In operation 1218, the video generation system may blend the first and second undistorted images with one another to obscure a seamline between the first and second undistorted images. For example, subsequent to the stitching together of undistorted images 1304 in operation 1214, operation 1218 may be performed to blend one or more pixels along the edges of the masked regions of undistorted mages 1304 (e.g., along seamline 1402) in order to obscure the seam between undistorted images 1304. Along with the equalization of the exposure performed in operation 1216, the blending performed in operation 1218 may help unify the colors and otherwise remove noticeable indicators that the final stitched-together image is a stitched image formed from raw images captured by different video capture devices and, instead, give the impression that each stitched image is one continuous image captured by a single video capture device capable of capturing a true spherical image.

While particular operations have been described in relation to operation 622 and to method 1200 in general, it will be understood that additional or alternative operations may also be performed in certain implementations. For example, system 100 may perform an operation in which a completed stitched image (e.g., a single frame of stitched video content generated by operation 622 from a single image set) may be encoded according to a video or data compression scheme, encrypted according to a video or data encryption scheme, or the like. System 100 may perform one or more of these additional or alternative operations frame by frame as each image set is being processed (i.e., similar to other operations described herein). Additionally or alternatively, system 100 may perform one or more of these operations for an entire instance of stitched video content after all the image sets have been processed.

After the video stitching process of operation 622 (i.e., operations 1208 through 1218) has been performed on every particular image set in the plurality of image sets in the concurrently-captured video data received from the video capture devices, system 100 may proceed to operation 1220. In operation 1220, the video generation system may form, based on the performing of the video stitching process for each particular image set in the plurality of image sets, stitched video content representative of the scene. For example, operation 1220 may be performed based on the masking of the warped first and second undistorted images by including only the non-redundant regions to which the mask has been applied and disregarding the redundant regions to which the mask has not been applied. As described above, once the stitched video content has been generated, the stitched video content may be distributed and rendered in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 15:
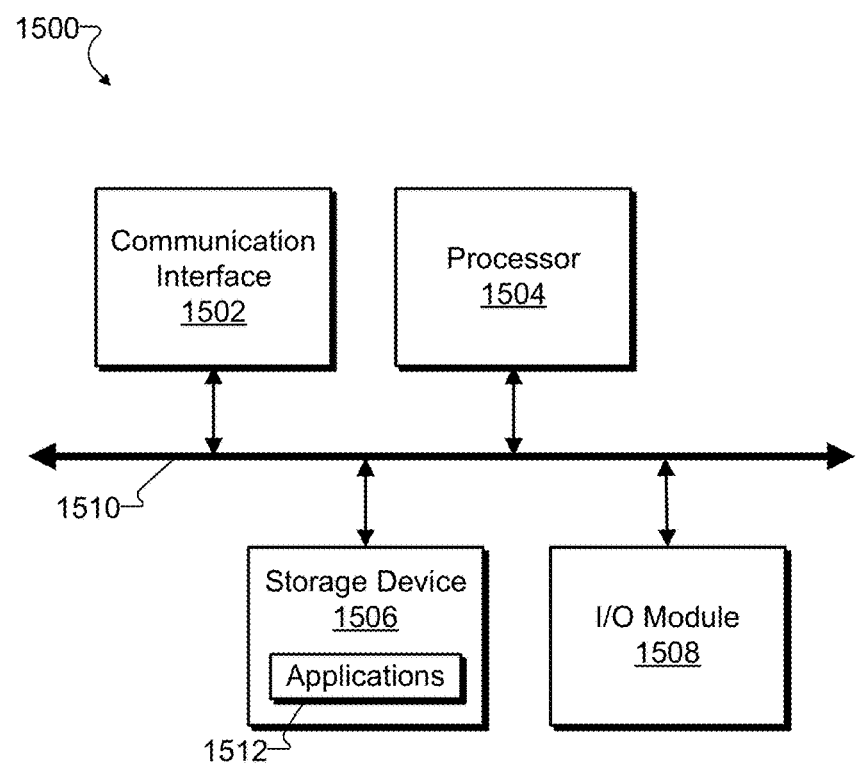
FIG. 15 illustrates an exemplary computing device according to principles described herein.

FIG. 15 illustrates an exemplary computing device 1500 that may be specifically configured to perform one or more of the processes described herein. As shown in FIG. 15, computing device 1500 may include a communication interface 1502, a processor 1504, a storage device 1506, and an input/output ("I/O") module 1508 communicatively connected via a communication infrastructure 1510. While an exemplary computing device 1500 is shown in FIG. 15, the components illustrated in FIG. 15 are not intended to be limiting. Additional or alternative components may be used in other embodiments. Components of computing device 1500 shown in FIG. 15 will now be described in additional detail.

Communication interface 1502 may be configured to communicate with one or more computing devices. Examples of communication interface 1502 include, without limitation, a wired network interface (such as a network interface card), a wireless network interface (such as a wireless network interface card), a modem, an audio/video connection, and any other suitable interface.

Processor 1504 generally represents any type or form of processing unit capable of processing data or interpreting, executing, and/or directing execution of one or more of the instructions, processes, and/or operations described herein. Processor 1504 may direct execution of operations in accordance with one or more applications 1512 or other computer-executable instructions such as may be stored in storage device 1506 or another computer-readable medium.

Storage device 1506 may include one or more data storage media, devices, or configurations and may employ any type, form, and combination of data storage media and/or device. For example, storage device 1506 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1506. For example, data representative of one or more executable applications 1512 configured to direct processor 1504 to perform any of the operations described herein may be stored within storage device 1506. In some examples, data may be arranged in one or more databases residing within storage device 1506.

I/O module 1508 may include one or more I/O modules configured to receive user input and provide user output. One or more I/O modules may be used to receive input for a single virtual reality experience. I/O module 1508 may include any hardware, firmware, software, or combination thereof supportive of input and output capabilities. For example, I/O module 1508 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1508 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1500. For example, one or more applications 1512 residing within storage device 1506 may be configured to direct processor 1504 to perform one or more processes or functions associated with facilities 102 through 106 of system 100. Likewise, storage facility 108 of system 100 may be implemented by or within storage device 1506.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

receiving, by a video generation system from a plurality of video capture devices located in a static configuration with respect to one another such that the video capture devices in the plurality of video capture devices collectively capture a scene, a plurality of raw video instances, each raw video instance in the plurality of raw video instances including video data that partially overlaps with video data from at least one other raw video instance in the plurality of raw video instances and that is concurrently and asynchronously captured with video data from all of the other raw video instances in the plurality of raw video instances;

temporally synchronizing, by the video generation system, the concurrently and asynchronously captured video data of each raw video instance in the plurality of the raw video instances to form a plurality of image sets, each image set in the plurality of image sets including a raw image from each raw video instance in the plurality of raw video instances, wherein all of the raw images within each image set in the plurality of image sets are captured simultaneously;

identifying, by the video generation system, a visual feature within both a first raw image and a second raw image of a particular image set from the plurality of image sets, the first and second raw images distorted based on characteristics of a first video capture device and a second video capture device of the plurality of video capture devices that, respectively, captured the first and second raw images;

undistorting, by the video generation system concurrently with or subsequent to the identifying of the visual feature and based on at least one distortion coefficient associated with the plurality of video capture devices, the first and second raw images of the particular image set to generate a first undistorted image corresponding to the first raw image and a second undistorted image corresponding to the second raw image;

mapping, by the video generation system and based on the at least one distortion coefficient, the visual feature identified within both the first and the second raw images of the particular image set to both the first and the second undistorted images, respectively;

matching, by the video generation system based on the mapping, the visual feature mapped to the first undistorted image with the visual feature mapped to the second undistorted image;

determining, by the video generation system based on the matching, camera registration parameter data representative of the plurality of video capture devices and the static configuration in which the plurality of video capture devices is located; and performing, by the video generation system based on the camera registration parameter data, a video stitching process for each image set in the plurality of image sets to form stitched video content representative of the scene.

2. The method of claim 1, wherein the temporally synchronizing of the concurrently and asynchronously captured video data of each raw video instance in the plurality of the raw video instances to form the plurality of image sets comprises:

identifying, based on respective audio tracks associated with and synchronized to each raw video instance in the plurality of raw video instances, an audible feature common to every respective audio track associated with the raw video instances in the plurality of raw video instances; and forming the plurality of image sets by associating together, into each image set in the plurality of image sets, one raw image from every raw video instance in the plurality of raw video instances that is captured at a same temporal offset from the identified audible feature common to every respective audio track associated with the raw video instances in the plurality of raw video instances.

3. The method of claim 1, wherein the undistorting of the first and second raw images of the particular image set to generate the first and second undistorted images includes masking the first and second undistorted images by:

differentiating one or more regions of the first and second undistorted images that derive from the first and second raw images, respectively, from one or more regions of the first and second undistorted images that are artifacts of the undistorting of the first and second raw images; and applying a mask to only the one or more regions of the first and second undistorted images that derive from the first and second raw images and not to the one or more regions of the first and second undistorted images that are artifacts of the undistorting of the first and second raw images;

wherein the mapping of the visual feature and the matching of the visual feature are both further based on the masking of the first and second undistorted images, and the camera registration parameter data includes data representative of the mask applied to only the one or more regions of the first and second undistorted images that derive from the first and second raw images and not to the one or more regions of the first and second undistorted images that are artifacts of the undistorting of the first and second raw images.

4. The method of claim 3, further comprising:

determining, by the video generation system based on the masking of the first and second undistorted images and on the matching of the visual feature, a relative rotation of the first video capture device and the second video capture device of the plurality of video capture devices.

5. The method of claim 1, wherein:

a camera registration process performed with respect to the particular image set includes
the identifying of the visual feature within both the first and second raw images of the particular image set,
the undistorting of the first and second raw images of the particular image set,
the mapping of the visual feature identified within both the first and the second raw images of the particular image set to both the first and the second undistorted images, and
the matching of the visual feature mapped to the first undistorted image with the visual feature mapped to the second undistorted image; and prior to a successful performing of the camera registration process with respect to the particular image set, the method further comprises
making, by the video generation system, one or more attempts to perform the camera registration process with respect to one or more additional image sets within the plurality of image sets, and
determining, by the video generation system, that the one or more attempts to perform the camera registration process with respect to the one or more other image sets each fails to determine valid camera registration parameter data.

6. The method of claim 1, wherein the camera registration parameter data includes:

intrinsic parameters representative of at least one characteristic of each video capture device in the plurality of video capture devices; and extrinsic parameters representative of a relative positioning of each video capture device in the plurality of video capture devices with respect to other video capture devices in the plurality of video capture devices.

7. The method of claim 1, embodied as computer-executable instructions on at least one non-transitory computer-readable medium.

8. A method comprising:

receiving, by a video generation system from a plurality of video capture devices located in a static configuration with respect to one another such that video capture devices in the plurality of video capture devices collectively capture a scene, a plurality of raw video instances, each raw video instance in the plurality of raw video instances including video data that partially overlaps with video data from at least one other raw video instance in the plurality of raw video instances and that is concurrently and asynchronously captured with video data from all of the other raw video instances in the plurality of raw video instances;

temporally synchronizing, by the video generation system, the concurrently and asynchronously captured video data of each raw video instance in the plurality of the raw video instances to form a plurality of image sets, each image set in the plurality of image sets including a raw image from each raw video instance in the plurality of raw video instances, wherein all of the raw images within each image set in the plurality of image sets are captured simultaneously;

determining, by the video generation system based on a camera registration process performed with respect to at least one image set in the plurality of image sets, camera registration parameter data representative of the plurality of video capture devices and the static configuration in which the plurality of video capture devices is located, the camera registration process including
identifying a visual feature within both a first raw image and a second raw image of a particular image set of the plurality of image sets, the first and second raw images distorted based on characteristics of a first video capture device and a second video capture device of the plurality of video capture devices that, respectively, captured the first and second raw images,
undistorting, concurrently with or subsequent to the identifying of the visual feature, the first and second raw images to generate a first undistorted image corresponding to the first raw image and a second undistorted image corresponding to the second raw image, and
mapping the visual feature identified within both the first and the second raw images of the particular image set to both the first and the second undistorted images, respectively;

performing, by the video generation system for each particular image set in the plurality of image sets, a video stitching process by undistorting, based on at least one distortion coefficient associated with the plurality of video capture devices, a first raw image of the particular image set and a second raw image of the particular image set that overlaps the first raw image to generate a first undistorted image corresponding to the first raw image and a second undistorted image corresponding to the second raw image, warping, based on the camera registration parameter data, the first and the second undistorted images to contour to a three-dimensional framework, compositing, based on the camera registration parameter data, the warped first and second undistorted images onto a particular area of the three-dimensional framework such that the warped first and second undistorted images overlap with one another in accordance with the camera registration parameter data to form an overlapping region, and stitching together, along a seam within the overlapping region in which the warped first and second undistorted images overlap on the three-dimensional framework, the warped first and the second undistorted images with respect to the particular area of the three-dimensional framework onto which the warped first and second images are composited; and forming, by the video generation system based on the performing of the video stitching process for each particular image set in the plurality of image sets, stitched video content representative of the scene.

9. The method of claim 8, wherein:

the plurality of raw video instances received from the plurality of video capture devices are real-time video streams; and the video stitching process is performed in real time as the plurality of raw video instances are received from the plurality of video capture devices.

10. The method of claim 8, wherein:

the warping of the first undistorted image is performed concurrently with the warping of the second undistorted image;

the concurrent warping of the first and second undistorted images is performed based on intrinsic parameters included within the camera registration parameter data, the intrinsic parameters representative of at least one characteristic of the first video capture device and at least one characteristic of the second video capture device; and the three-dimensional framework is a spherical framework.

11. The method of claim 8, wherein:

the compositing of the warped first and second undistorted images onto the particular area of the three-dimensional framework is performed based on extrinsic parameters included within the camera registration parameter data, the extrinsic parameters representative of a relative positioning of the first video capture device with respect to the second video capture device; and the compositing of the warped first and second undistorted images onto the particular area of the three-dimensional framework includes rotating the warped first and second undistorted images based on the extrinsic parameters, and aligning the warped first and second undistorted images based on the extrinsic parameters to form the overlapping region.

12. The method of claim 8, wherein the stitching together of the warped first and second undistorted images with respect to the particular area of the three-dimensional framework comprises:

designating a seamline that spans the overlapping region; and masking the warped first and second undistorted images by differentiating a non-redundant region of the first undistorted image from a redundant region of the first undistorted image, the non-redundant region of the first undistorted image including a region of the first undistorted image on a first side of the seamline and the redundant region of the first undistorted image including a region of the first undistorted image on a second side of the seamline opposite the first side of the seamline, differentiating a non-redundant region of the second undistorted image from a redundant region of the second undistorted image, the non-redundant region of the second undistorted image including a region of the second undistorted image on the second side of the seamline and the redundant region of the second undistorted image including a region of the second undistorted image on the first side of the seamline, and applying a mask to only the non-redundant regions of the first and second undistorted images and not to the redundant regions of the first and second undistorted images;

wherein the forming of the stitched video content representative of the scene is based on the masking of the warped first and second undistorted images by including only the non-redundant regions to which the mask has been applied and disregarding the redundant regions to which the mask has not been applied.

13. The method of claim 8, wherein the video stitching process is further performed by:

equalizing an exposure characteristic of the first undistorted image and an exposure characteristic of the second undistorted image; and blending, subsequent to the stitching together of the first and second undistorted images, the first and second undistorted images with one another to obscure a seamline between the first and second undistorted images.

14. The method of claim 8, embodied as computer-executable instructions on at least one non-transitory computer-readable medium.

15. A system comprising:

at least one physical computing device that receives, from a plurality of video capture devices located in a static configuration with respect to one another such that the video capture devices in the plurality of video capture devices collectively capture a scene, a plurality of raw video instances, each raw video instance in the plurality of raw video instances including video data that partially overlaps with video data from at least one other raw video instance in the plurality of raw video instances and that is concurrently and asynchronously captured with video data from all of the other raw video instances in the plurality of raw video instances;

temporally synchronizes the concurrently and asynchronously captured video data of each raw video instance in the plurality of the raw video instances to form a plurality of image sets, each image set in the plurality of image sets including a raw image from each raw video instance in the plurality of raw video instances, wherein all of the raw images within each image set in the plurality of image sets are captured simultaneously;

identifies a visual feature within both a first raw image and a second raw image of a particular image set from the plurality of image sets, the first and second raw images distorted based on characteristics of a first video capture device and a second video capture device of the plurality of video capture devices that, respectively, captured the first and second raw images;

undistorts, concurrently with or subsequent to the identifying of the visual feature and based on at least one distortion coefficient associated with the plurality of video capture devices, the first and second raw images of the particular image set to generate a first undistorted image corresponding to the first raw image and a second undistorted image corresponding to the second raw image;

maps, based on the at least one distortion coefficient, the visual feature identified within both the first and the second raw images of the particular image set to both the first and the second undistorted images, respectively;

matches, based on the mapping, the visual feature mapped to the first undistorted image with the visual feature mapped to the second undistorted image;

determines, based on the matching, camera registration parameter data representative of the plurality of video capture devices and the static configuration in which the plurality of video capture devices is located; and performs, based on the camera registration parameter data, a video stitching process for each image set in the plurality of image sets to form stitched video content representative of the scene.

16. The system of claim 15, wherein the at least one physical computing device undistorts the first and second raw images of the particular image set to generate the first and second undistorted images by masking the first and second undistorted image, the masking comprising:

differentiating one or more regions of the first and second undistorted images that derive from the first and second raw images, respectively, from one or more regions of the first and second undistorted images that are artifacts of the undistorting of the first and second raw images; and applying a mask to only the one or more regions of the first and second undistorted images that derive from the first and second raw images and not to the one or more regions of the first and second undistorted images that are artifacts of the undistorting of the first and second raw images;

wherein the mapping of the visual feature and the matching of the visual feature are both further based on the masking of the first and second undistorted images, and the camera registration parameter data includes data representative of the mask applied to only the one or more regions of the first and second undistorted images that derive from the first and second raw images and not to the one or more regions of the first and second undistorted images that are artifacts of the undistorting of the first and second raw images.

17. The system of claim 15, wherein:

the at least one physical computing device performs a camera registration process with respect to the particular image set by performing the identification of the visual feature within both the first and second raw images of the particular image set, the undistorting of the first and second raw images of the particular image set, the mapping of the visual feature identified within both the first and the second raw images of the particular image set to both the first and the second undistorted images, and the match of the visual feature mapped to the first undistorted image with the visual feature mapped to the second undistorted image; and prior to a successful performance of the camera registration process with respect to the particular image set, the at least one physical computing devices further makes one or more attempts to perform the camera registration process with respect to one or more additional image sets within the plurality of image sets, and determines that the one or more attempts to perform the camera registration process with respect to the one or more other image sets each fails to determine valid camera registration parameter data.

18. A system comprising:

at least one physical computing device that receives, from a plurality of video capture devices located in a static configuration with respect to one another such that video capture devices in the plurality of video capture devices collectively capture a scene, a plurality of raw video instances, each raw video instance in the plurality of raw video instances including video data that partially overlaps with video data from at least one other raw video instance in the plurality of raw video instances and that is concurrently and asynchronously captured with video data from all of the other raw video instances in the plurality of raw video instances;

temporally synchronizes the concurrently and asynchronously captured video data of each raw video instance in the plurality of the raw video instances to form a plurality of image sets, each image set in the plurality of image sets including a raw image from each raw video instance in the plurality of raw video instances, wherein all of the raw images within each image set in the plurality of image sets are captured simultaneously;

determines, based on a camera registration process performed with respect to at least one image set in the plurality of image sets, camera registration parameter data representative of the plurality of video capture devices and the static configuration in which the plurality of video capture devices is located, the camera registration process including identifying a visual feature within both a first raw image and a second raw image of a particular image set of the plurality of image sets, the first and second raw images distorted based on characteristics of a first video capture device and a second video capture device of the plurality of video capture devices that, respectively, captured the first and second raw images, undistorting, concurrently with or subsequent to the identifying of the visual feature, the first and second raw images to generate a first undistorted image corresponding to the first raw image and a second undistorted image corresponding to the second raw image, and mapping the visual feature identified within both the first and the second raw images of the particular image set to both the first and the second undistorted images, respectively;

performs, for each particular image set in the plurality of image sets, a video stitching process by undistorting, based on at least one distortion coefficient associated with the plurality of video capture devices, a first raw image of the particular image set and a second raw image of the particular image set that overlaps the first raw image to generate a first undistorted image corresponding to the first raw image and a second undistorted image corresponding to the second raw image, warping, based on the camera registration parameter data, the first and the second undistorted images to contour to a three-dimensional framework, compositing, based on the camera registration parameter data, the warped first and second undistorted images onto a particular area of the three-dimensional framework such that the warped first and second undistorted images overlap with one another in accordance with the camera registration parameter data to form an overlapping region, and stitching together, along a seam within the overlapping region in which the warped first and second undistorted images overlap on the three-dimensional framework, the warped first and the second undistorted images with respect to the particular area of the three-dimensional framework onto which the warped first and second images are composited; and forms, by the video generation system based on the performance of the video stitching process for each particular image set in the plurality of image sets, stitched video content representative of the scene.

19. The system of claim 18, wherein:

the plurality of raw video instances the at least one physical computing device receives from the plurality of video capture devices are real-time video streams; and the at least one physical computing device performs the video stitching process in real time as the plurality of raw video instances are received from the plurality of video capture devices.

20. The system of claim 18, wherein the at least one physical computing device performs the video stitching process by further:

equalizing an exposure characteristic of the first undistorted image and an exposure characteristic of the second undistorted image; and blending, subsequent to the stitching together of the first and second undistorted images, the first and second undistorted images with one another to obscure a seamline between the first and second undistorted images.

* * * * *